United States Patent
Yamamoto et al.

(10) Patent No.: US 12,065,712 B2
(45) Date of Patent: Aug. 20, 2024

(54) GRAIN-ORIENTED ELECTRICAL STEEL SHEET AND METHOD FOR MANUFACTURING SAME

(71) Applicant: NIPPON STEEL CORPORATION, Tokyo (JP)

(72) Inventors: Shinji Yamamoto, Tokyo (JP); Yoshiyuki Ushigami, Tokyo (JP); Shinsuke Takatani, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 165 days.

(21) Appl. No.: 17/422,244

(22) PCT Filed: Jan. 16, 2020

(86) PCT No.: PCT/JP2020/001195
§ 371 (c)(1),
(2) Date: Jul. 12, 2021

(87) PCT Pub. No.: WO2020/149349
PCT Pub. Date: Jul. 23, 2020

(65) Prior Publication Data
US 2022/0074016 A1    Mar. 10, 2022

(30) Foreign Application Priority Data

Jan. 16, 2019 (JP) .................... 2019-004873
Jan. 16, 2019 (JP) .................... 2019-005199

(51) Int. Cl.
*H01F 1/147* (2006.01)
*C21D 3/04* (2006.01)
(Continued)

(52) U.S. Cl.
CPC ............. *C21D 9/46* (2013.01); *C21D 3/04* (2013.01); *C21D 6/005* (2013.01); *C21D 6/008* (2013.01);
(Continued)

(58) Field of Classification Search
None
See application file for complete search history.

(56) References Cited

U.S. PATENT DOCUMENTS

| | | |
|---|---|---|
| 2003/0180553 A1 | 9/2003 | Shigesato et al. |
| 2010/0006999 A1 | 1/2010 | Shiozaki et al. |
| 2020/0123662 A1* | 4/2020 | Takebayashi ........ C21D 8/1255 |

FOREIGN PATENT DOCUMENTS

| | | |
|---|---|---|
| EP | 0 565 029 A1 | 10/1993 |
| EP | 0 957 180 A2 | 11/1999 |

(Continued)

OTHER PUBLICATIONS

Test methods for electrical steel strip and sheet—Part 1: Methods of measurement of the magnetic properties of electrical steel strip and sheet by means of an Epstein frame, JIS C 2550-1, 2011, pp. 1930-1948.

(Continued)

*Primary Examiner* — Kim S. Horger
(74) *Attorney, Agent, or Firm* — Birch, Stewart, Kolasch & Birch, LLP

(57) ABSTRACT

This grain-oriented electrical steel sheet has a base steel sheet in which a final-annealed film is substantially not present on a surface, an intermediate layer that is disposed on a surface of the base steel sheet and mainly contains silicon oxide, and an insulation coating disposed on a surface of the intermediate layer. In the intermediate layer, a value obtained by dividing a standard deviation σ of a (Continued)

thickness of the intermediate layer by an average value T of the thickness of the intermediate layer is 0.500 or less.

2 Claims, 3 Drawing Sheets

(51) Int. Cl.
    *C21D 6/00*     (2006.01)
    *C21D 8/00*     (2006.01)
    *C21D 8/12*     (2006.01)
    *C21D 9/46*     (2006.01)
    *C22C 38/00*     (2006.01)
    *C22C 38/02*     (2006.01)
    *C22C 38/04*     (2006.01)
    *C22C 38/06*     (2006.01)
    *C22C 38/16*     (2006.01)

(52) U.S. Cl.
    CPC ........... *C21D 8/005* (2013.01); *C21D 8/1222* (2013.01); *C21D 8/1233* (2013.01); *C22C 38/001* (2013.01); *C22C 38/002* (2013.01); *C22C 38/02* (2013.01); *C22C 38/04* (2013.01); *C22C 38/06* (2013.01); *C22C 38/16* (2013.01); *H01F 1/147* (2013.01); *C22C 2202/02* (2013.01)

(56) References Cited

FOREIGN PATENT DOCUMENTS

| | | | |
|---|---|---|---|
| EP | 3 385 397 | A1 | 10/2018 |
| JP | 5-279747 | A | 10/1993 |
| JP | 6-184762 | A | 7/1994 |
| JP | 7-278833 | A | 10/1995 |
| JP | 9-78252 | A | 3/1997 |
| JP | 2003-171773 | A | 8/2003 |
| JP | 3930696 | B2 | 6/2007 |
| JP | 4044739 | B2 | 2/2008 |
| JP | 2010-21466 | A | 1/2010 |
| JP | 4473489 | B2 | 6/2010 |
| WO | WO-2019013353 | A1 * | 1/2019 ............... C21D 1/26 |

OTHER PUBLICATIONS

Testing methods for paints—Part 5: Mechanical property of film—Section 1: Bend test (cylindrical mandrel), JIS K 5600-5-1, 1999, (ISO 1519:1973), total 9 pages.

\* cited by examiner

GRAIN-ORIENTED ELECTRICAL STEEL SHEET AND METHOD FOR MANUFACTURING SAME

TECHNICAL FIELD

The present invention relates to a grain-oriented electrical steel sheet that has a low iron loss and is excellent in terms of the adhesion of an insulation coating and a method for manufacturing the same.

Priority is claimed on Japanese Patent Application No. 2019-5199, filed Jan. 16, 2019, and Japanese Patent Application No. 2019-4873, filed Jan. 16, 2019, the contents of which are incorporated herein by reference.

BACKGROUND ART

Grain-oriented electrical steel sheets are used as iron core materials of transformers and the like and are required to have magnetic properties represented by a high magnetic flux density and a low iron loss.

In order to ensure magnetic properties in grain-oriented electrical steel sheets, crystal orientations in base steel sheets are controlled to, for example, an orientation (Goss orientation) in which a {110} plane is aligned parallel to the sheet surface and a <100> axis is aligned to a rolling direction. In order to increase the accumulation of the Goss orientation, secondary recrystallization processes in which AlN, MnS, or the like is used as an inhibitor are being widely used.

In order to reduce the iron losses of grain-oriented electrical steel sheets, a coating is formed on a surface of a base steel sheet. This coating is formed to apply tension to the base steel sheet to reduce the iron loss of the steel sheet as a single sheet and also to ensure an electrical insulating property between grain-oriented electrical steel sheets at the time of using a laminate of the grain-oriented electrical steel sheets and thereby reduce iron losses as iron cores.

As a grain-oriented electrical steel sheet having a coating formed on a surface of a base steel sheet, for example, there is a grain-oriented electrical steel sheet in which a final-annealed film mainly containing forsterite ($Mg_2SiO_4$) is formed on a surface of a base steel sheet and an insulation coating is formed on the surface of the final-annealed film. These coatings (final-annealed film and insulation coating) each have a function of imparting an insulating property and a function of applying tension to the base steel sheet.

The final-annealed film is formed by, for example, a reaction between an annealing separator mainly containing magnesium (MgO) and the base steel sheet occurring during a heat treatment in which the annealing separator and the base steel sheet are held within a temperature range of 600° C. to 1200° C. for 30 hours or longer in final annealing for causing secondary recrystallization in the base steel sheet. In addition, the insulation coating is formed by, for example, applying a coating solution containing phosphoric acid or a phosphate, colloidal silica, and chromic anhydride or a chromate to the final-annealed base steel sheet and baking and drying the coating solution within a temperature range of 300° C. to 950° C. for 10 seconds or longer.

In order for coatings to exhibit desired tension and a desired insulating property, these coatings need to remain stuck to the base steel sheet and to have strong adhesion to the base steel sheet.

The adhesion between coatings and steel sheets is ensured mainly by an anchoring effect attributed to unevenness in the interface between a base steel sheet and a final-annealed film. However, this unevenness in the interface also serves as an obstacle to domain wall motion occurring during the magnetization of grain-oriented electrical steel sheets and thus also serves as a cause for hindering the iron loss reduction action. Therefore, in order to reduce the iron losses of grain-oriented electrical steel sheets in the absence of final-annealed film, techniques as described below, which are intended to ensure the adhesion of insulation coatings in a state in which the above-described interface is smoothed, have been performed.

For example, in order to enhance the adhesion of an insulation coating to a smoothed surface of a base steel sheet, the formation of an intermediate layer (base coating) between the base steel sheet and the insulation coating is proposed. Patent Document 1 discloses a method for forming an intermediate layer by applying an aqueous solution of a phosphate or an alkaline metal silicate. Patent Documents 2 to 4 disclose methods for forming an external oxidation-type silicon oxide film as an intermediate layer by performing a heat treatment on a base steel sheet at an appropriately controlled temperature in an appropriately controlled atmosphere for several tens of seconds to several minutes.

These external oxidation-type silicon oxide films exhibit a certain degree of effect on the improvement of the adhesion of the insulation coatings and the reduction of iron losses by the smoothing of unevenness in the interface between the base steel sheet and the coating. However, the effect was not sufficient in terms of practical use regarding, particularly, the adhesion of insulation coatings, and thus additional technical developments have been underway.

For example, Patent Document 5 discloses a grain-oriented silicon steel sheet in which a base steel sheet is manufactured by intentionally preventing the generation of an inorganic mineral coating of forsterite and then a tension-applying insulation coating is formed. In this grain-oriented silicon steel sheet, a film-like externally oxidized film mainly containing silica having an average film thickness of 2 nm or more and 500 nm or less is provided in the interface between the tension-applying insulation coating and the steel sheet. Additionally, Patent Document 5 discloses a grain-oriented silicon steel sheet that is excellent in terms of the coating adhesion of a tension-applying insulation coating and has an externally oxidized granular oxide mainly containing silica that is generated in a form of penetrating the film thickness of the film-like externally oxidized film, is present in a form of intruding into the tension-applying insulation coating, and has a cross-sectional area rate of 2% or more of the film-like externally oxidized film.

CITATION LIST

Patent Document

[Patent Document 1]

Japanese Unexamined Patent Application, First Publication No. H05-279747

[Patent Document 2]

Japanese Unexamined Patent Application, First Publication No. H06-184762

[Patent Document 31

Japanese Unexamined Patent Application, First Publication No. H09-078252

[Patent Document 4]
Japanese Unexamined Patent Application, First Publication No. H07-278833
[Patent Document 5]
Japanese Patent No. 3930696

SUMMARY OF THE INVENTION

Problems to be Solved by the Invention

In the case of directly forming an insulation coating on metallic Fe, which is a main component of a base steel sheet, it is rarely possible to obtain the adhesion of the insulation coating. Therefore, the coating structures of grain-oriented electrical steel sheets that are widely used practically at the moment include a three-layer structure "base steel sheet 1/final-annealed film 2A/insulation coating 3" shown in FIG. 2 as a basic structure. The insulation coating 3 is ordinarily made up of a plurality of compounds containing one or more of P, O, and S.

In contrast, the coating structures of grain-oriented electrical steel sheets in which the interface form between a base steel sheet and an insulation coating is smoothed using an intermediate layer include a three-layer structure "base steel sheet 1/intermediate layer 2B/insulation coating 3" shown in FIG. 1 as a basic structure.

In the above-described grain-oriented electrical steel sheets having an intermediate layer mainly containing silicon oxide (for example, silicon dioxide ($SiO_2$) or the like) described in Patent Documents 1 to 5, the iron losses were reduced (that is, the surfaces of the base steel sheets were smoothed), but it was not possible to say that the adhesion of the insulation coatings was sufficient compared with grain-oriented electrical steel sheets having a final-annealed film.

The present invention has been made in consideration of the above-described circumstances. An objective of the present invention is to provide a grain-oriented electrical steel sheet that has a low iron loss and is excellent in terms of the adhesion of an insulation coating and a method for manufacturing the same.

Means for Solving the Problem

The gist of the present invention is as described below.
(1) A grain-oriented electrical steel sheet according to an aspect of the present invention is a grain-oriented electrical steel sheet having a base steel sheet in which a final-annealed film is substantially not present on a surface,
an intermediate layer that is disposed on a surface of the base steel sheet and mainly contains silicon oxide, and
an insulation coating disposed on a surface of the intermediate layer,
in which, in the intermediate layer, a value obtained by dividing a standard deviation a of a thickness of the intermediate layer by an average value T of the thickness of the intermediate layer is 0.500 or less.
(2) A method for manufacturing a grain-oriented electrical steel sheet according to another aspect of the present invention is a method for manufacturing the grain-oriented electrical steel sheet according to (1), including
a hot rolling process of heating a slab containing Si and then performing hot rolling to obtain a hot-rolled steel sheet,
a hot-band annealing process of performing hot band annealing on the hot-rolled steel sheet to obtain an annealed steel sheet,
a cold rolling process of performing cold rolling on the annealed steel sheet once or twice or more with intermediate annealing performed therebetween to obtain a cold-rolled steel sheet,
a decarburization annealing process of performing decarburization annealing on the cold-rolled steel sheet to obtain a decarburization-annealed steel sheet,
a final annealing process of heating the decarburization-annealed steel sheet with an annealing separator having a MgO content of 10 mass % to 50 mass % applied to a surface of the decarburization-annealed steel sheet and then removing the annealing separator to obtain a final-annealed steel sheet,
an intermediate layer forming process of performing thermal oxidation annealing on the final-annealed steel sheet to form an intermediate layer on a surface of the final-annealed steel sheet, and
an insulation coating forming process of forming an insulation coating on the final-annealed steel sheet having the intermediate layer formed thereon,
in which, in a cooling procedure of the final annealing process,
T1 is set to 1100° C. in a case where a final annealing temperature is 1100° C. or higher and T1 is set to the final annealing temperature in a case where the final annealing temperature is lower than 1100° C., and
the decarburization-annealed steel sheet is cooled within a temperature range of T1 to 500° C. in an atmosphere having an oxidation degree ($P_{H2O}/P_{H2}$) of 0.3 to 100000,
during the thermal oxidation annealing in the intermediate layer forming process,
in a heating procedure,
an average heating rate within a temperature range of 300° C. to 750° C. is set to 20° C./second to 200° C./second, an oxidation degree ($P_{H2O}/P_{H2}$) within the temperature range is set to 0.0005 to 0.1, the final-annealed steel sheet is heated up to a temperature range of 750° C. to 1150° C., and,
within the temperature range of 750° C. to 115° C.,
the final-annealed steel sheet is held in an atmosphere having an oxidation degree ($P_{H2O}/P_{H2}$) of 0.0005 to 0.2 for 10 seconds to 90 seconds.

Effects of the Invention

According to the aspects of the present invention, it is possible to provide a grain-oriented electrical steel sheet that has a low iron loss and is excellent in terms of the adhesion of an insulation coating and a method for manufacturing the same.

EMBODIMENTS FOR IMPLEMENTING THE INVENTION

Figure 1:
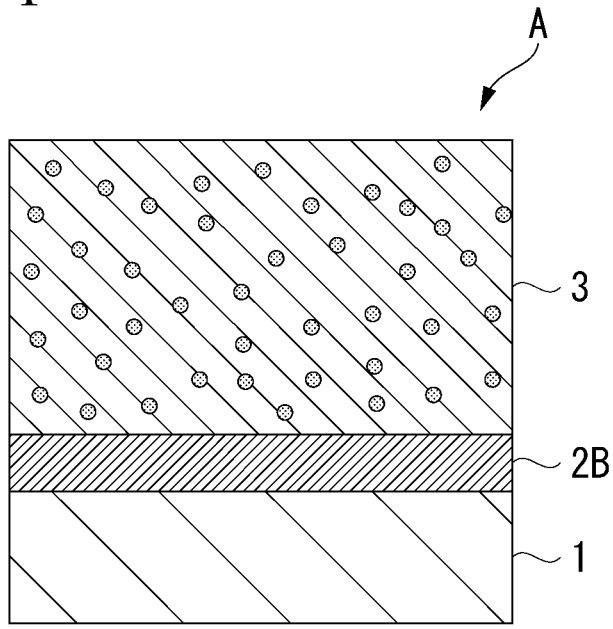
FIG. 1 is a view schematically showing a coating structure of a grain-oriented electrical steel sheet according to a first embodiment.
Figure 2:
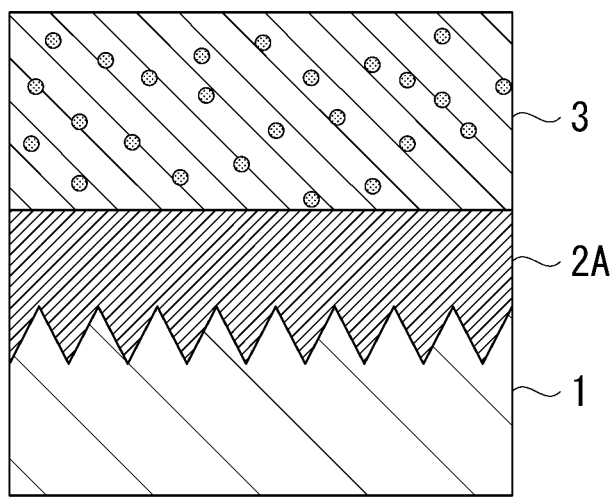
FIG. 2 is a view schematically showing a coating structure of a grain-oriented electrical steel sheet having a final-annealed film and an insulation coating, which corresponds to the related art.

In the present embodiments, among grain-oriented electrical steel sheets having a base steel sheet, an intermediate layer disposed on a surface of the base steel sheet, and an insulation coating disposed on the surface of the intermediate layer, particularly, a grain-oriented electrical steel sheet having a characteristic in the thickness of the intermediate layer is referred to as a grain-oriented electrical steel sheet according to a first embodiment. In addition, in the present embodiments, among grain-oriented electrical steel sheets having a base steel sheet, an intermediate layer disposed on a surface of the base steel sheet, and an insulation coating disposed on the surface of the intermediate layer, a grain-oriented electrical steel sheet having a characteristic particularly in metallic Fe phases present in the interface between the intermediate layer and the insulation coating is referred to as a grain-oriented electrical steel sheet according to a second embodiment.

Hereinafter, the grain-oriented electrical steel sheet according to the first embodiment and the grain-oriented electrical steel sheet according to the second embodiment will be described.

[Grain-Oriented Electrical Steel Sheet According to First Embodiment]

First, the grain-oriented electrical steel sheet according to the first embodiment and a method for manufacturing the same will be described in detail.

The grain-oriented electrical steel sheet according to the first embodiment is a grain-oriented electrical steel sheet having a base steel sheet in which a final-annealed film is substantially not present on a surface, an intermediate layer that is disposed on a surface of the base steel sheet and mainly contains silicon oxide, and an insulation coating disposed on a surface of the intermediate layer. A value (a/T) obtained by dividing the standard deviation a of the thickness of the intermediate layer by the average value T of the thickness of the intermediate layer is 0.500 or less.

Here, the intention of "final-annealed film is substantially not present" will be described.

In ordinary grain-oriented electrical steel sheets, a final-annealed film made from an oxide of forsterite ($Mg_2SiO_4$), spinel ($MgAl_2O_4$), cordierite ($Mg_2Al_4Si_5O_{16}$), and/or the like is interposed between a base steel sheet and an insulation coating, and adhesion between oxide films (final-annealed film and insulation coating) and the base steel sheet is ensured by an anchoring effect of complicated interfacial unevenness. When there is, even locally, a portion in which this final-annealed film is not present, it is not possible to ensure the adhesion between the base steel sheet and the insulation coating in that portion. Therefore, in ordinary grain-oriented electrical steel sheets, the final-annealed film is formed in a state of fully covering the surface of the base steel sheet.

In contrast, in the grain-oriented electrical steel sheet according to the first embodiment, the final-annealed film is not required to ensure the adhesion of the insulation coating. In the grain-oriented electrical steel sheet according to the first embodiment, it is possible to ensure the adhesion of the insulation coating even in a case where the final-annealed film is completely not present, surely, in a case where the final-annealed film is locally deficient. In addition, the complicated interfacial unevenness attributed to the final-annealed film is not a preferable condition in terms of the magnetic properties of grain-oriented electrical steel sheets. Therefore, from the viewpoint of the magnetic properties, there is no merit of leaving the final-annealed film, and it is preferable that the final-annealed film is completely not present.

However, in a procedure for manufacturing the grain-oriented electrical steel sheet according to the first embodiment, it is possible to consider a status in which the oxide of forsterite, spinel, cordierite, or the like is formed in a non-film-shaped form or, in a procedure of removing a once-formed final-annealed film, a part of the final-annealed film slightly remains. The present embodiment does not exclude the presence of such an oxide. That is, the "final-annealed film is substantially not present" is specified in consideration of such a form. Specifically, in the cross-sectional observation of the grain-oriented electrical steel sheet, the area of the oxide of forsterite, spinel, cordierite, or the like observed is equal to or smaller than the area of the intermediate layer observed, furthermore, ½ or smaller, and furthermore, 1/10 or smaller. It is needless to say that the best form is that the area of the oxide of forsterite, spinel, cordierite, or the like observed is zero.

A grain-oriented electrical steel sheet A having an intermediate layer 2B mainly containing silicon oxide on a surface of a base steel sheet 1 in which a final-annealed film is substantially not present has a coating structure as schematically shown in FIG. 1. The grain-oriented electrical steel sheet A has a three-layer structure "base steel sheet 1/intermediate layer 2B/insulation coating 3" shown in FIG. 1 as a basic structure.

In the grain-oriented electrical steel sheet having the intermediate layer 2B mainly containing silicon oxide on the surface of the base steel sheet 1, the iron loss is reduced by smoothing the surface of the base steel sheet. However, in the related art, there have been no studies to improve the adhesion of insulation coatings by paying attention to the shape of the intermediate layer 2B.

As described above, in grain-oriented electrical steel sheets having a final-annealed film, which correspond to the related art, interfacial unevenness between the final-annealed film 2A and the base steel sheet 1, that is, unevenness on the surface of the final-annealed film 2A leads to an anchoring effect. Therefore, the present inventors conduct studies regarding the adhesion of the insulation coating 3 by paying attention to the thickness of the intermediate layer 2B with an expectation that the adhesion of the insulation coating 3 is enhanced when the thickness of the intermediate layer 2B is nonuniform. As a result, the present inventors found that, unlike the expectation, when the thickness of the intermediate layer 2B is made uniform, the adhesion of the insulation coating 3 improves.

The reason for the adhesion of the insulation coating 3 being improved by uniforming the thickness of the intermediate layer 2B is not clear, but the present inventors consider as described below. Unlike the final-annealed film 2A, in the intermediate layer 2B having a smoothed surface, even when the thickness is made nonuniform, the anchoring effect is not strong as much. When the thickness is made nonuniform, since a demerit of stress concentrating at a specific site is greater than a merit of obtaining the anchoring effect, the adhesion of the insulation coating 3 degrades. Therefore, when the thickness of the intermediate layer 2B is made uniform as in the grain-oriented electrical steel sheet according to the first embodiment, stress does not concentrate at a specific site, and the adhesion of the insulation coating 3 improves.

Hereinafter, the three-layer structure of the grain-oriented electrical steel sheet according to the first embodiment will be described. In the following description, reference signs in the drawings will be shown only in a case where the drawings are described.

Intermediate Layer

The intermediate layer is formed on a surface of the base steel sheet and mainly contains silicon oxide. The intermediate layer has a function of adhering the base steel sheet and the insulation coating. In the grain-oriented electrical steel sheet according to the first embodiment, the intermediate layer refers to a layer present between a base steel sheet described below and an insulation coating described below. The expression "mainly containing silicon oxide" means that the Fe content is less than 30 atom %, the P content is less than 5 atom %, the Si content is 20 atom % or more, the O content is 50 atom % or more, and the Mg content is 10 atom % or less. Silicon oxide, which is the main component of the intermediate layer, is preferably $SiO_x$ (x=1.0 to 2.0) and more preferably $SiO_x$ (x=1.5 to 2.0). This is because silicon oxide is more stable. When a heat treatment for forming silicon oxide on the surface of the base steel sheet is sufficiently performed, it is possible to form silica ($SiO_2$).

In the grain-oriented electrical steel sheet according to the first embodiment, in the intermediate layer, the value obtained by dividing the standard deviation σ of the thickness of the intermediate layer by the average value T of the thickness of the intermediate layer is 0.500 or less. That is, the intermediate layer satisfies an expression (standard deviation σ of thickness of intermediate layer/average value T of thickness of intermediate layer≤0.500). Ordinarily, a value obtained by dividing the standard deviation σ by the average value T is referred to as the coefficient of variation. With this coefficient of variation, it is possible to relatively evaluate the relationship between the average value of data and the variation of the data.

Hereinafter, "the value obtained by dividing the standard deviation σ of the thickness of the intermediate layer by the average value T of the thickness of the intermediate layer" will be simply referred to as "the coefficient of variation of the thickness of the intermediate layer" in some cases.

In the grain-oriented electrical steel sheet according to the first embodiment, the coefficient of variation of the thickness of the intermediate layer is set to 0.500 or less to make the thickness of the intermediate layer uniform, whereby it is possible to suppress stress concentrating at a part of the interface between the intermediate layer and the insulation coating. Therefore, it becomes possible to improve the adhesion of the insulation coating. In order to further improve the adhesion of the insulation coating, the coefficient of variation of the thickness of the intermediate layer is preferably set to 0.400 or less, more preferably set to 0.350 or less, and still more preferably set to 0.300 or less. The coefficient of variation of the thickness of the intermediate layer is preferably as small as possible, but may be set to 0.050 or more or 0.100 or more.

When the thickness of the intermediate layer is too thin, there is a case where a region in which the intermediate layer is inevitably and partially not coated is formed on the surface of the base steel sheet and it is not possible to ensure the adhesion of the insulation coating. Therefore, the thickness of the intermediate layer is preferably 2 nm or more and more preferably 5 nm or more.

On the other hand, when the thickness of the intermediate layer is too thick, there is a case where it is not possible to control the thickness of the intermediate layer uniformly or a case where a defect such as a void or a crack is generated in the intermediate layer. Therefore, the thickness of the intermediate layer is preferably 400 nm or less and more preferably 300 nm or less. In addition, the intermediate layer is made as thin as possible as long as it is possible to ensure the adhesion of the insulation coating, whereby it is possible to contribute to the enhancement of productivity by shortening the formation time and to suppress a decrease in the space factor at the time of using the grain-oriented electrical steel sheet as an iron core. Therefore, the thickness of the intermediate layer is preferably set to 200 nm or less and more preferably 100 nm or less.

The thickness of the intermediate layer can be obtained by, for example, observing a specimen cross section with a scanning transmission electron microscope (STEM) as described below and measuring the thickness. From measurement values obtained as described above, the average value T and standard deviation σ of the thickness of the intermediate layer are obtained.

Specifically, a test piece is cut out by focused ion beam (FIB) machining such that the cut surface becomes parallel to the sheet thickness direction and perpendicular to a rolling direction, and the cross-sectional structure of this cut surface is observed with a STEM at a magnification at which each layer is included in an observation visual field (light field image). In a case where each layer is not included in the observation visual field, the cross-sectional structure is observed in a plurality of visual fields that are continuous with each other.

In order to specify each layer in the cross-sectional structure, a line analysis is performed along the sheet thickness direction from the surface of the grain-oriented electrical steel sheet using STEM-energy dispersive X-ray spectroscopy (STEM-EDS), and a quantitative analysis is performed on the chemical composition of each layer. On the observation cross section of the specimen, the line analysis is performed at 100 sites at intervals of 0.1 pm in a direction parallel to the surface of the base steel sheet. As the line analysis, a quantitative analysis is performed at intervals of 1 nm in the sheet thickness direction by energy dispersive X-ray spectroscopy (EDS) in which the diameter of an electron beam is set to 10 nm.

Elements to be quantitatively analyzed are five elements of Fe, P, Si, O, and Mg.

From the light field image observation results with the STEM and the quantitative analysis results of STEM-EDS, the kind of each layer is specified, and the thickness of each layer is measured. Specifically, the kind of each layer is specified according to criteria described below, and the average value of the thicknesses of each layer measured at the 100 sites is calculated to obtain the thickness of each layer. The obtained thickness of the intermediate layer (the average value of the thicknesses of the intermediate layer measured at the 100 sites) is defined as the average value T of the thickness of the intermediate layer. In addition, a standard deviation is calculated from the thicknesses of the intermediate layer at the 100 sites, thereby obtaining the standard deviation σ of the thickness of the intermediate layer. The obtained standard deviation σ of the thickness of the intermediate layer is divided by the average value T, thereby obtaining the coefficient of variation (σ/T) of the thickness of the intermediate layer.

The specification of each layer and the measurement of the thickness described below are all performed on the same scanning line.

A region in which the Fe content is 80 atom % or more is determined as the base steel sheet.

A region in which the Fe content is less than 45 atom %, the P content is 5 atom % or more, the Si content is less than 20 atom %, the O content is 50 atom % or more, and the Mg content is 10 atom % or less is determined as the insulation coating.

A region satisfying a Fe content of less than 30 atom %, a P content of less than 5 atom %, a Si content of 20 atom % or more, an O content of 50 atom % or more, and a Mg content of 10 atom % or less is determined as the intermediate layer.

When each layer is determined by the chemical composition as described above, there is a case where a region that does not correspond to any compositions in the analysis (blank region) is generated. However, in the grain-oriented electrical steel sheet according to the first embodiment, each layer is specified so as to be included in the three-layer structure of the base steel sheet, the intermediate layer, and the insulation coating. Determination criteria therefor are as described below.

Regarding a blank region between the base steel sheet and the intermediate layer, the center of the blank region (the center in the thickness direction, which shall apply below) is considered as a boundary, the base steel sheet side is regarded as the base steel sheet, and the intermediate layer side is regarded as the intermediate layer. Regarding a blank region between the insulation coating and the intermediate layer, the center of the blank region is considered as a boundary, the insulation coating side is regarded as the insulation coating, and the intermediate layer side is regarded as the intermediate layer.

When the intermediate layer is not present, regarding a blank region between the base steel sheet and the insulation coating, the center of the blank region is regarded as a boundary, the base steel sheet side is regarded as the base steel sheet, and the insulation coating side is regarded as the insulation coating. A blank region, the base steel sheet, and the insulation coating that are present between the intermediate layer and the intermediate layer are regarded as the intermediate layer. A blank region and the insulation coating that are present between the base steel sheet and the base steel sheet is regarded as the base steel sheet. A blank region between the insulation coating and the insulation coating is regarded as the insulation coating.

With this system, it is possible to separate the base steel sheet, the insulation coating, and the intermediate layer.

Insulation Coating

The insulation coating 3 is formed on the surface of the intermediate layer 2B as shown in FIG. 1 and has a function of reducing the iron loss of the grain-oriented electrical steel sheet A as a single sheet by applying tension to the base steel sheet 1 and a function of ensuring an electrical insulating property between the grain-oriented electrical steel sheets A at the time of using a laminate of the grain-oriented electrical steel sheets A.

The insulation coating is not particularly limited, can be appropriately selected and used from well-known insulating coatings depending on uses or the like, and may be any of an organic coating or an inorganic coating. Examples of the organic coating include a polyamine-based resin, an acrylic resin, an acrylic styrene resin, an alkyd resin, a polyester resin, a silicone resin, a fluororesin, a polyolefin resin, a styrene resin, a vinyl acetate resin, an epoxy resin, a phenolic resin, an urethane resin, a melamine resin, and the like. Examples of the inorganic coating include a phosphate-based coating, furthermore, an organic-inorganic complex-based coating containing the above-described resin, and the like. More specifically, the insulation coating may be an insulating coating obtained by baking an insulating coating having colloidal silica particles dispersed in a matrix as shown in FIG. 1. Here, the "matrix" refers to a substrate of the insulation coating and is made from, for example, a non-crystalline phosphate. Examples of the non-crystalline phosphate that configures the matrix include aluminum phosphate, magnesium phosphate, and the like. The baked insulation coating is made up of a plurality of compounds containing one or more of P, O, and Si.

When the thickness of the insulation coating becomes thin, tension that is applied to the base steel sheet becomes small, and the insulating property also degrades. Therefore, the thickness of the insulation coating is preferably 0.1 μm or more and more preferably 0.5 μm or more. On the other hand, when the thickness of the insulation coating exceeds 10 μm, there is a case where a crack is generated in the insulation coating in an insulation coating forming stage. Therefore, the thickness of the insulation coating is preferably 10 μm or less and more preferably 5 μm or less.

On the insulation coating, a magnetic domain refining treatment for forming a local fine strain region or groove may be performed with a laser or plasma or by a mechanical method, etching, and/or other methods.

Base Steel Sheet

The chemical composition and configuration such as the structure of the base steel sheet in the grain-oriented electrical steel sheet according to the first embodiment do not have any direct relationship with the coating structure of the grain-oriented electrical steel sheet except that Si is contained as an essential component. Therefore, the base steel sheet in the grain-oriented electrical steel sheet according to the first embodiment is not particularly limited as long as the action and effect of the grain-oriented electrical steel sheet according to the first embodiment can be obtained, and it is possible to use, for example, a base steel sheet in an ordinary grain-oriented electrical steel sheet.

Hereinafter, the base steel sheet in the grain-oriented electrical steel sheet according to the first embodiment will be described.

Chemical Composition of Base Steel Sheet

As the chemical composition of the base steel sheet, it is possible to use the chemical composition of a base steel sheet in an ordinary grain-oriented electrical steel sheet. In the following description, the unit of the amount of each component in the chemical composition of the base steel sheet is "mass %". Numerical limitation ranges expressed using "to" in the middle include the lower limit value and the upper limit value in the ranges.

The base steel sheet of the grain-oriented electrical steel sheet according to the first embodiment contains, for example, Si: 0.50% to 7.00%, C: 0.005% or less, and N: 0.0050% or less, and the remainder is made up of Fe and an impurity. Hereinafter, regarding a typical example of the chemical composition of the base steel sheet of the grain-oriented electrical steel sheet according to the present embodiment, reasons for limiting the chemical composition will be described.

Si: 0.50% to 7.00%

Silicon (Si) increases the electrical resistance of the grain-oriented electrical steel sheet to decrease the iron loss. When the Si content is less than 0.50%, this effect cannot be sufficiently obtained. Therefore, the Si content is preferably 0.50% or more. The Si content is more preferably 1.50% or more and still more preferably 2.50% or more.

On the other hand, when the Si content exceeds 7.00%, the saturation magnetic flux density of the base steel sheet decreases, and the iron loss of the grain-oriented electrical steel sheet deteriorates. Therefore, the Si content is preferably 7.00% or less. The Si content is more preferably 5.50% or less and still more preferably 4.50% or less.

C: 0.005% or Less

Carbon (C) forms a compound in the base steel sheet and deteriorates the iron loss of the grain-oriented electrical steel sheet. Therefore, the C content is preferably 0.005% or less. The C content is more preferably 0.004% or less and still more preferably 0.003% or less.

On the other hand, the C content is preferably as small as possible and thus may be 0%, but there is a case where C is contained in steel as an impurity. Therefore, the C content may be more than 0%.

N: 0.0050% or Less

Nitrogen (N) forms a compound in the base steel sheet and deteriorates the iron loss of the grain-oriented electrical steel sheet. Therefore, the N content is preferably 0.0050% or less. The N content is more preferably 0.0040% or less and still more preferably 0.0030% or less.

On the other hand, the N content is preferably as small as possible and thus may be 0%, but there is a case where N is contained in steel as an impurity. Therefore, the N content may be more than 0%.

The remainder of the chemical composition of the base steel sheet is made up of Fe and an impurity. The "impurity" mentioned herein refers to an element that comes from a component contained in a raw material or a component being mixed in a manufacturing procedure at the time of industrially manufacturing the base steel sheet and has no substantial influence on an effect that is obtained by the grain-oriented electrical steel sheet according to the present embodiment.

[Optional Elements]

Basically, the chemical composition of the base steel sheet contains the above-described elements with the remainder made up of Fe and an impurity, but may contain one or more optional elements instead of some of Fe for the purpose of improving the magnetic properties or solving problems relating to manufacturing. Examples of the optional elements that are contained instead of some of Fe include the following elements. Since these elements may not be contained, the lower limits are 0%. On the other hand, when the amounts of these elements are too large, a precipitate is generated, thereby deteriorating the iron loss of the grain-oriented electrical steel sheet or ferrite transformation is suppressed to prevent the sufficient obtainment of a Goss orientation or to decrease the saturation magnetic flux density, thereby deteriorating the iron loss of the grain-oriented electrical steel sheet. Therefore, even in a case where these elements are contained, the contents are preferably set within the following ranges.

Acid-soluble Al: 0.0065% or less,
Mn: 1.00% or less,
S and Se: 0.001% or less in total.
Bi: 0.010% or less,
B: 0.0080% or less,
Ti: 0.015% or less,
Nb: 0.020% or less,
V: 0.015% or less,
Sn: 0.50% or less,
Sb: 0.50% or less.
Cr: 0.30% or less,
Cu: 0.40% or less,
P: 0.50% or less,
Ni: 1.00% or less, and
Mo: 0.10% or less.

"S and Se: 0.001% or less in total" means that the base steel sheet may contain any one of S or Se alone and the amount of any one of S or Se may be 0.001% or less or the base steel sheet may contain both S and Se and the amount of S and Se may be 0.001% or less in total.

The above-described chemical composition of the base steel sheet of the grain-oriented electrical steel sheet according to the present embodiment is obtained by adopting a method for manufacturing the grain-oriented electrical steel sheet according to the present embodiment using a slab having a chemical composition described below.

The chemical composition of the base steel sheet of the grain-oriented electrical steel sheet according to the present embodiment is preferably measured using spark optical emission spectrometry (Spark-OES). In addition, in the case of a small content, the content may be measured using inductively coupled plasma-mass spectrometry (ICP-MS). Acid-soluble Al may be measured by ICP-MS using a filtrate obtained by hydrolyzing a specimen with an acid. In addition, C and S may be measured using an infrared absorption method after combustion, and N may be measured using an inert gas fusion thermal conductivity method.

Surface Roughness (Ra)

Ordinarily, the surface roughness (Ra) of the base steel sheet is controlled from the viewpoint of enhancing the adhesion of the insulation coating by increasing the surface roughness and the viewpoint of avoiding adverse influences on the iron loss by decreasing the surface roughness. In a case where the surface roughness is large, it is possible to ensure the adhesion of the insulation coating regardless of variations in the coefficient of variation of the thickness of the intermediate layer. In other words, the control of the coefficient of variation of the thickness of the intermediate layer for the purpose of ensuring the adhesion of the insulation coating becomes important in base steel sheets having a small surface roughness. Originally, the grain-oriented electrical steel sheet according to the first embodiment is about a grain-oriented electrical steel sheet in which the interface between a base steel sheet and an insulation coating is smoothed using an intermediate layer.

The surface roughness of the base steel sheet in the grain-oriented electrical steel sheet according to the first embodiment is preferably set to 1.0 μm or less in terms of Ra (arithmetic average roughness) so as to prevent the formation of unevenness in the interface between the insulation coating and the base steel sheet and to prevent the iron loss reduction effect from being hindered. The surface roughness is more preferably 0.8 μm or less or 0.6 μm or less. In addition, from the viewpoint of reducing the iron loss of the grain-oriented electrical steel sheet by applying large tension to the base steel sheet, the surface roughness is still more preferably 0.5 μm or less or 0.3 μm or less in terms of Ra. The surface roughness is preferably as small as possible, but may be set to 0.01 μm or more in terms of Ra.

The surface roughness (Ra: arithmetic surface roughness) of the base steel sheet can be obtained by, for example, observing the reflected electron image of a cross section of the base steel sheet perpendicular to a rolling direction with a scanning electron microscope (SEM). Specifically, a reflected electron image obtained with an SEM is converted to a monochromatic image with 256 levels of grayscale and converted to a binarized image using a 30% grayscale level from the white side as a threshold value, and a white region is defined as the base steel sheet. The positional coordinates of the surface of the base steel sheet in the sheet thickness direction in this binarized image are measured with a precision of 0.01 μm or more, and Ra is calculated. The positional coordinates are measured in a continuous 2 mm range at 0.1 μm pitches in a direction parallel to the surface of the base steel sheet (20000 points in total), and this measurement is performed in at least five places. In addition, the average value of the calculated Ra values in each place is calculated, thereby obtaining the surface roughness (Ra) of the base steel sheet.

Method for Manufacturing Grain-Oriented Electrical Steel Sheet According to First Embodiment Next, a method for manufacturing the grain-oriented electrical steel sheet according to the first embodiment will be described.

The method for manufacturing the grain-oriented electrical steel sheet described below is a method for manufacturing the grain-oriented electrical steel sheet described in the section of "the grain-oriented electrical steel sheet according to the first embodiment".

The method for manufacturing the grain-oriented electrical steel sheet according to the first embodiment, in which the intermediate layer and the insulation coating are formed in separate processes, includes
   a hot rolling process of heating a slab and then performing hot rolling to obtain a hot-rolled steel sheet,
   a hot-band annealing process of performing hot band annealing on the hot-rolled steel sheet to obtain an annealed steel sheet, and
   a cold rolling process of performing cold rolling on the annealed steel sheet once or twice or more with intermediate annealing performed therebetween to obtain a cold-rolled steel sheet.

In addition, the method for manufacturing the grain-oriented electrical steel sheet according to the first embodiment includes
   a decarburization annealing process of performing decarburization annealing on the cold-rolled steel sheet to obtain a decarburization-annealed steel sheet and
   a final annealing process of heating the decarburization-annealed steel sheet with an annealing separator having a MgO content of 10 mass % to 50 mass % applied to a surface of the decarburization-annealed steel sheet to a temperature range of 1000° C. or higher to perform final annealing and then removing the annealing separator to obtain a final-annealed steel sheet.

In a cooling procedure after heating the decarburization-annealed steel sheet to a temperature range of 1000° C. or higher, T1 is set to 1100° C. in a case where the final annealing temperature is 1100° C. or higher and T1 is set to the final annealing temperature in a case where the final annealing temperature is lower than 1100° C., and the decarburization-annealed steel sheet is cooled within a temperature range of T1 to 500° C. in an atmosphere having an oxidation degree ($P_{H2O}/P_{H2}$) of 0.3 to 100000.

Furthermore, the method for manufacturing the grain-oriented electrical steel sheet according to the first embodiment includes
   an intermediate layer forming process of performing thermal oxidation annealing, in which the final-annealed steel sheet is heated to a temperature range of 750° C. to 1150° C. and held within the temperature range of 750° C. to 1150° C. in an atmosphere having an oxidation degree (Po/Pm) of 0.0005 to 0.2 for 10 seconds to 90 seconds, to form an intermediate layer mainly containing silicon oxide on the surface of the final-annealed steel sheet and
   an insulation coating forming process of applying a coating solution to the surface of the intermediate layer and baking the coating solution to form an insulation coating.

In the thermal oxidation annealing in the intermediate layer forming process, in a heating procedure, the final-annealed steel sheet is heated within a temperature range of 300° C. to 750° C. at an average heating rate of 20° C./second to 200° C./second in an atmosphere having an oxidation degree ($P_{H2O}/P_{H2}$) of 0.0005 to 0.1.

The method for manufacturing the grain-oriented electrical steel sheet according to the first embodiment is characterized particularly in that the hindrance of the iron loss reduction action of the insulation coating due to interfacial unevenness between the final-annealed film and the base steel sheet is avoided and the intermediate layer mainly containing silicon oxide is formed on the surface of the base steel sheet in order to ensure the adhesion between the insulation coating and the base steel sheet attributed to the intermediate layer. Therefore, in the method for manufacturing the grain-oriented electrical steel sheet according to the first embodiment, particularly characteristic processes are the final annealing process and the intermediate layer forming process.

First, the chemical composition of the slab in the method for manufacturing the grain-oriented electrical steel sheet according to the first embodiment will be described.

The slab is prepared according to a well-known technique, and a typical example of the chemical composition is as described below.

The chemical composition contains, by mass %,
   Si: 0.80% to 7.00%,
   C: 0.085% or less,
   acid-soluble Al: 0.010% to 0.065%,
   N: 0.004% to 0.012%,
   Mn: 0.05% to 1.00%, and
   S and Se: 0.003% to 0.015% in total
with a remainder being made up of Fe and an impurity.

Hereinafter, reasons for limiting the typical example of the chemical composition will be described. "%" used to express the amount of each element in the chemical composition of the slab indicates "mass %" unless particularly otherwise described. Numerical limitation ranges expressed using "to" in the middle include the lower limit value and the upper limit value in the ranges.

Si: 0.80% to 7.00%

Si is an essential component and increases the electrical resistance to reduce the iron loss of the grain-oriented electrical steel sheet. In addition, when Si is contained in a high concentration, a strong chemical affinity is developed between the intermediate layer mainly containing silicon oxide and the base steel sheet, and the intermediate layer and the base steel sheet adhere to each other more strongly. However, when the Si content exceeds 7.00%, cold rolling becomes extremely difficult, and a crack is likely to be generated during cold rolling. Therefore, the Si content is preferably set to 7.00% or less. The Si content is more preferably 4.50% or less and still more preferably 4.00% or less. On the other hand, when Si content is less than 0.80%, γ transformation occurs during final annealing, and the crystal orientation of the grain-oriented electrical steel sheet is impaired. Therefore, the Si content is preferably set to 0.80% or more. The Si content is more preferably 2.00% or more and still more preferably 2.50% or more.

C: 0.085% or Less

C is an effective element for controlling primary recrystallization structures, but adversely affects the magnetic properties of the grain-oriented electrical steel sheet. Therefore, in the method for manufacturing the grain-oriented electrical steel sheet according to the first embodiment, decarburization annealing is performed before final annealing. When the C content exceeds 0.085%, the decarburization annealing time becomes long, and the productivity in industrial production is impaired. Therefore, the C content is preferably set to 0.085% or less. The lower limit of the C content is not particularly limited, but the C content is more preferably 0.020% or more and still more preferably 0.050% or more.

C is purified in the decarburization annealing process and the final annealing process, which will be described below, and the C content reaches 0.005% or less after the final annealing process. Depending on the conditions of the decarburization annealing process and final annealing, there is a case where the final-annealed steel sheet contains no C.

Acid-Soluble Al: 0.010% to 0.065%

Acid-soluble Al bonds with N to be precipitated as (Al, Si)N. This precipitate functions as an inhibitor. In a case where the acid-soluble Al content is 0.010% to 0.065%, secondary recrystallization is stabilized. Therefore, the acid-soluble Al content is preferably set to 0.010% to 0.065%. The acid-soluble Al content is more preferably 0.020% or more and still more preferably 0.025% or more. In addition, from the viewpoint of the stability of secondary recrystallization, the acid-soluble Al content is more preferably 0.040% or less and still more preferably 0.030% or less.

Since acid-soluble Al is purified in the final annealing process, depending on the conditions of final annealing, there is a case where the final-annealed steel sheet contains no acid-soluble Al.

N: 0.004% to 0.012%

N bonds with Al to function as an inhibitor. When the N content is less than 0.004%, it is not possible to obtain a sufficient amount of an inhibitor. Therefore, the N content is preferably set to 0.004% or more. The N content is more preferably 0.006% or more and still more preferably 0.007% or more. On the other hand, when the N content is more than 0.012%, a defect called a blister is likely to be generated in the steel sheet. Therefore, the N content is preferably set to 0.012% or less. The N content is more preferably 0.010% or less and still more preferably 0.009% or less. Since N is purified in the final annealing process, depending on the conditions of final annealing, there is a case where the final-annealed steel sheet contains no N.

Mn: 0.05% to 1.00%

S and Se: 0.003% to 0.015% in total

Mn generates MnS and MnSe together with S and Se. These composite compounds function as an inhibitor. In a case where the Mn content is 0.05% to 1.00%, secondary recrystallization is stabilized. Therefore, the Mn content is preferably set to 0.05% to 1.00%. The Mn content is more preferably 0.08% or more and still more preferably 0.09% or more. In addition, the Mn content is more preferably 0.50% or less and still more preferably 0.20% or less.

In a case where the amount of S and Se is 0.003% to 0.015% in total, secondary recrystallization is stabilized. Therefore, the amount of S and Se is preferably set to 0.003% to 0.015% in total.

Here, "the amount of S and Se is 0.003% to 0.015% in total" means that the slab may contain any one of S or Se alone and the amount of any one of S or Se may be 0.003% to 0.015% or the slab may contain both S and Se and the amount of S and Se may be 0.003% to 0.015% in total.

Remainder

The remainder is made up of Fe and an impurity. The "impurity" refers to an element that comes from a component contained in a raw material or a component being mixed in a manufacturing procedure at the time of industrially manufacturing the slab.

Optional Elements

In consideration of the strengthening of the inhibitor function or the influence on the magnetic properties attributed to the formation of a compound, it is possible to contain a variety of kinds of optional elements instead of some of Fe that is the remainder according to well-known documents. Examples of the optional elements that are contained instead of some of Fe include the following elements. These elements are optional elements and may not be contained, and thus the lower limits thereof are 0%.

Bi: 0.010% or less,
B: 0.080% or less,
Ti: 0.015% or less,
Nb: 0.20% or less,
V: 0.15% or less,
Sn: 0.10% or less,
Sb: 0.10% or less,
Cr: 0.30% or less,
Cu: 0.40% or less,
P: 0.50% or less,
Ni: 1.00% or less, and
Mo: 0.10% or less.

Hereinafter, each process of the method for manufacturing the grain-oriented electrical steel sheet according to the first embodiment will be described. Hereinafter, as the conditions of processes other than the above-described particularly characteristic processes (final annealing process and intermediate layer forming process), ordinary conditions will be described as an example. Therefore, even when the ordinary conditions are not satisfied, it is possible to obtain the effect of the grain-oriented electrical steel sheet according to the first embodiment.

Hot Rolling Process

In the hot rolling process, ordinarily, the slab is heated within a temperature range of 800° C. to 1300° C. and then hot-rolled, thereby obtaining a hot-rolled steel sheet. Examples of the chemical composition of the slab include the above-described chemical composition of the slab.

The slab is obtained by, for example, melting steel having the above-described chemical composition in a converter, an electric furnace, or the like, performing a vacuum degassing treatment as necessary, and then performing continuous casting or ingot casting and blooming. The thickness of the slab is not particularly limited, but is, for example, preferably 150 mm to 350 mm and more preferably 220 mm to 280 mm. In addition, the slab may have a thickness of approximately 10 mm to 70 mm (so-called "thin slab"). In the case of using a thin slab, it is possible to skip rough rolling before final rolling in the hot rolling process.

The heating temperature of the slab is preferably set to 1200° C. or lower since it is possible to avoid, for example, a variety of problems generated in the case of heating the slab at, for example, a temperature higher than 1200° C. (a necessity of a designated heating furnace, a large amount of molten scale, and the like).

In a case where the heating temperature of the slab is too low, there is a case where hot rolling becomes difficult and the productivity degrades. Therefore, the heating temperature of the slab is preferably set to 950° C. or higher. In addition, it is also possible to skip the slab heating process and begin hot rolling until the temperature of the slab lowers after casting.

The heating time of the slab may be set to 40 minutes to 120 minutes.

In the hot rolling process, rough rolling is performed on the heated slab, and final rolling is further performed thereon, thereby producing a hot-rolled steel sheet having a predetermined thickness. After the completion of final rolling, the hot-rolled steel sheet is coiled at a predetermined temperature.

In addition, the sheet thickness of the hot-rolled steel sheet is not particularly limited, but is preferably set to, for example, 3.5 mm or less.

Hot-Band Annealing Process

In the hot-band annealing process, hot band annealing is performed on the hot-rolled steel sheet, thereby obtaining an annealed steel sheet. As hot band annealing conditions, ordinary conditions may be adopted, and it is preferable to set, for example, the annealing temperature (the furnace temperature of a hot band annealing furnace) to 750° C. to 1200° C. and the annealing time (the dwell time in the hot band annealing furnace) to 30 seconds to 600 seconds as the conditions. The hot-rolled steel sheet may be quenched after being held under the above-described conditions.

Cold Rolling Process

In the cold rolling process, cold rolling is performed on the annealed steel sheet once or twice or more with intermediate annealing performed therebetween to obtain a cold-rolled steel sheet. A pickling treatment may be performed on the annealed steel sheet before cold rolling on the annealed steel sheet.

In the case of performing the cold rolling process a plurality of times without performing an intermediate annealing process, there is a case where it is difficult to obtain uniform characteristics in the manufactured grain-oriented electrical steel sheet. On the other hand, in the case of performing the cold rolling process a plurality of times with an intermediate annealing process performed therebetween, there is a case where the magnetic flux density decreases in the manufactured grain-oriented electrical steel sheet. Therefore, the number of times of the cold rolling process and the presence or absence of the intermediate annealing process are determined depending on characteristics demanded for the finally manufactured grain-oriented electrical steel sheet and the manufacturing costs.

The cold rolling reduction in the final cold rolling (final cold rolling reduction) in cold rolling performed once or a plurality of times is not particularly limited, but is preferably set to 80% or larger and more preferably 90% or larger from the viewpoint of crystal orientation control.

The cold-rolled steel sheet obtained by the cold rolling process is wound in a coil shape. The sheet thickness of the cold-rolled steel sheet is not particularly limited, but is preferably set to 0.35 mm or less and more preferably set to 0.30 mm or less in order to further reduce the iron loss of the grain-oriented electrical steel sheet.

Decarburization Annealing Process

In the decarburization annealing process, it is preferable to perform decarburization annealing on the cold-rolled steel sheet to obtain a decarburization-annealed steel sheet. Specifically, decarburization annealing is performed, thereby causing primary recrystallization in the cold-rolled steel sheet and removing C contained in the cold-rolled steel sheet. Decarburization annealing is preferably performed in a wet atmosphere containing hydrogen and nitrogen in order to remove C. As decarburization annealing conditions, it is preferable to set, for example, the decarburization annealing temperature (the temperature of a furnace in which decarburization annealing is performed) to 800° C. to 950° C. and the decarburization annealing time to 30 seconds to 180 seconds.

Final Annealing Process

In the final annealing process, final annealing is performed by heating the decarburization-annealed steel sheet with an annealing separator applied thereto. With the final annealing, secondary recrystallization is caused in the decarburization-annealed steel sheet.

In ordinary methods for manufacturing grain-oriented electrical steel sheets, a final annealing process is performed by, ordinarily, applying an annealing separator having a high magnesium concentration (for example, MgO≥90%) to the surface of the decarburization-annealed steel sheet in order to form a final-annealed film mainly containing forsterite ($Mg_2SiO_4$). Ordinarily, the annealing separator is applied not only to prevent seizure between final-annealed steel sheets but also to form a final-annealed film made from forsterite ($Mg_2SiO_4$).

In contrast, in the final annealing process of the method for manufacturing the grain-oriented electrical steel sheet according to the first embodiment, the final annealing is performed by heating the decarburization-annealed steel sheet with an annealing separator having a low magnesium concentration and containing aluminum oxide (for example, MgO: 10 mass % to 50 mass %, $Al_2O_3$: 50 mass % to 90 mass %) applied to the surface of the decarburization-annealed steel sheet. After that, the annealing separator is removed to obtain a final-annealed steel sheet. As a result, it is possible to form an intermediate layer without substantially forming a final-annealed film made from forsterite ($Mg_2SiO_4$). The MgO content in the annealing separator is preferably 15 mass % or more and more preferably 20 mass % or more. In addition, the MgO content in the annealing separator is preferably 45 mass % or less and more preferably 40 mass % or less.

As the heating conditions in final annealing, ordinary conditions may be adopted, and, for example, the heating rate to the final annealing temperature is set to 5° C./h to 100° C./h, the final annealing temperature (the temperature of a furnace in which final annealing is performed) is set to 1000° C. to 1300° C., and the final annealing time (the holding time at the final annealing temperature) is set to 10 hours to 50 hours.

In order to obtain an intermediate layer having a thickness that varies only to a small extent in the intermediate layer forming process described below, the oxidation degree ($P_{H_2O}/P_{H_2}$) of the atmosphere within a predetermined temperature range is controlled to 0.3 to 100000 in a cooling procedure after holding the decarburization-annealed steel sheet at the final annealing temperature of 1000° C. to 1300° C. for 10 hours to 50 hours. When T1 is set to 1100° C. in a case where the final annealing temperature is 1100° C. or higher and T1 is set to the final annealing temperature in a case where the final annealing temperature is lower than 1100° C., the temperature range within which the oxidation degree of the atmosphere is controlled is set to a temperature range of T1 to 500° C.

In the final-annealed steel sheet from which the annealing separator has been removed after the cooling of the decarburization-annealed steel sheet under the above-described conditions, Fe-based oxides are appropriately formed on the surface, and it is considered that these oxides affect the formation of the intermediate layer and thereby the film thickness of the intermediate layer becomes uniform.

In a case where the oxidation degree of the atmosphere within the temperature range of T1 to 500° C. is less than 0.3, since no Fe-based oxides are formed, the film thickness of the intermediate layer becomes nonuniform. In a case where the oxidation degree ($P_{H2O}/P_{H2}$) of the atmosphere within the temperature range of T1 to 500° C. exceeds 100000, since a large amount of an oxide is formed, and the oxide remains even after the intermediate layer forming process, the adhesion of the insulation coating degrades.

The time taken to cool the decarburization-annealed steel sheet under the above-described conditions (time taken to cool the decarburization-annealed steel sheet from T1° C. to 500° C.) is not particularly limited, but is preferably set to 5 hours to 30 hours. The method for removing the annealing separator is also not particularly limited, and examples thereof include rubbing the surface of the final-annealed steel sheet with a brush and the like.

Intermediate layer forming process In the intermediate layer forming process, thermal oxidation annealing is performed by heating the final-annealed steel sheet to a temperature range of 750° C. to 1150° C. and holding the final-annealed steel sheet within the temperature range in an atmosphere having an oxidation degree ($P_{H2O}/P_{H2}$) of 0.0005 to 0.2 for 10 seconds to 60 seconds, whereby an intermediate layer mainly containing silicon oxide is formed on the surface of the final-annealed steel sheet.

In the heating procedure of thermal oxidation annealing, the final-annealed steel sheet is heated within a temperature range of 300° C. to 750° C. at an average heating rate of 20° C./second to 200° C./second in an atmosphere having an oxidation degree ($P_{H2O}/P_{H2}$) of 0.0005 to 0.1. The average heating rate mentioned herein refers to a value obtained by dividing the temperature rise width from 300° C. to 750° C. by the time taken for the temperature to reach 750° C. from 300° C.

In the case of raising the temperature under such conditions, it is considered that an oxide formed on the surface of the final-annealed steel sheet is reduced from a low temperature range in which a reaction is slow to form the intermediate layer and thus the thickness of the intermediate layer become uniform.

The intermediate layer is preferably formed in a thickness of 2 nm to 400 nm.

In the intermediate layer forming process, the surface of the final-annealed steel sheet is thermally oxidized by a heat treatment, thereby forming an intermediate layer on the surface of the final-annealed steel sheet.

From the viewpoint of the reaction rate, the temperature at which the final-annealed steel sheet is held for 10 seconds to 60 seconds during thermal oxidation annealing is preferably 750° C. or higher. However, when the holding temperature becomes higher than 1150° C., it becomes difficult to maintain the intermediate layer forming reaction uniform, unevenness in the interface between the intermediate layer and the base steel sheet becomes large, and there are a case where the iron loss of the grain-oriented electrical steel sheet deteriorates and a case where the strength of the grain-oriented electrical steel sheet decreases, treatments in continuous annealing furnaces become difficult, and the productivity degrades.

The holding time within the temperature range of 750° C. to 1150° C. is preferably set to 10 seconds or longer from the viewpoint of preferably forming the intermediate layer. In addition, from the viewpoint of the productivity and the viewpoint of avoiding a decrease in the space factor caused by the thickening of the thickness of the intermediate layer, the holding time is preferably set to 60 seconds or shorter.

From the viewpoint of forming the intermediate layer in a thickness of 2 nm to 400 nm, the final-annealed steel sheet is preferably held within the temperature range of 750° C. to 1000° C. for 15 seconds to 60 seconds and more preferably held with the temperature range of 750° C. to 900° C. for 25 seconds to 60 seconds.

Insulation coating forming process In the insulation coating forming process, well-known conditions may be applied. For example, a coating solution is applied to the surface of the intermediate layer and then baked within a temperature range of 350° C. to 1150° C. for 5 to 300 seconds in an atmosphere containing hydrogen, water vapor, and nitrogen and having an oxidation degree ($P_{H2O}/P_{H2}$) of 0.001 to 1.0 to form the coating solution to the intermediate layer.

The insulation coating is preferably formed in a thickness of 0.1 μm to 10 μm,

The coating solution is also not particularly limited, and it is possible to distinctively use a coating solution containing colloidal silica and a coating solution containing no colloidal silica. In the case of forming an insulation coating using a coating solution containing colloidal silica, it is possible to form an insulation coating containing Si. In addition, in the case of forming an insulation coating using a coating solution containing no colloidal silica, it is possible to form an insulation coating containing no Si.

The coating solution is also not particularly limited, and a well-known coating solution may be appropriately used. For example, it is possible to use a coating solution mainly containing a phosphate and colloidal silica.

Examples of the coating solution containing no colloidal silica include coating solutions containing boric acid and alumina sol.

In addition, examples of the coating solution containing colloidal silica include coating solutions containing phosphoric acid or a phosphate, colloidal silica, and chromic anhydride or a chromate. Examples of the phosphate include phosphates of Ca, Al, Mg, Sr, and the like. Examples of the chromate include chromates of Na, K, Ca, Sr, and the like. The colloidal silica is not particularly limited, and any appropriate particle size thereof can be used.

A variety of elements or compounds may be further added to the coating solution in order to improve a variety of characteristics as long as the effects of the grain-oriented electrical steel sheet according to the first embodiment are not lost.

In a cooling procedure of the insulation coating forming process, it is preferable to perform cooling under the following conditions within a temperature range of 600° C. to 1150° C. in order to prevent the insulation coating and the intermediate layer from changing (decomposing or the like) after baking.

Oxidation degree ($P_{H2O}/P_{H2}$) of atmosphere: 0.001 to 1.0
Dwell time: 10 seconds to 30 seconds In the cooling procedure of the insulation coating forming process, when the oxidation degree ($P_{H2O}/P_{H2}$) within the temperature range of 600° C. to 1150° C. is less than 0.001, there is a case where the insulation coating decomposes. In addition, when the oxidation degree (Po/Pm) of the atmosphere within the above-described temperature range exceeds 1.0, there is a case where the base steel sheet is significantly oxidized and the iron loss of the grain-oriented electrical steel sheet deteriorates. The oxidation degree ($P_{H2O}/P_{H2}$) of the atmosphere within the above-described temperature range is preferably 0.002 to 0.05 and more preferably 0.003 to 0.03.

The gas in the atmosphere may be a gas that is ordinarily used, and it is possible to use, for example, a gas made up of hydrogen and nitrogen with an impurity.

After the end of such a heat treatment, cooling is performed.

The temperature at which the cooling is controlled is preferably 600° C. to 1050° C. and more preferably 650° C. to 950° C.

When the dwell time within the temperature range of 600° C. to 1150° C. is shorter than 10 seconds, there is a case where the steel sheet shape becomes poor due to cooling unevenness. When the dwell time within the above-described temperature range exceeds 30 seconds, there is a case where the steel sheet is oxidized and the iron loss of the grain-oriented electrical steel sheet deteriorates. The dwell time within the above-described temperature range is preferably 10 seconds to 25 seconds and more preferably seconds to 20 seconds.

Other Processes

The method for manufacturing the grain-oriented electrical steel sheet according to the first embodiment may further have a process that is ordinarily performed in methods for manufacturing grain-oriented electrical steel sheets. The manufacturing method may further have a nitriding treatment process of performing a nitriding treatment that increases the N content of the decarburization-annealed steel sheet between the beginning of the decarburization annealing and the initiation of secondary recrystallization in the final annealing. This is because it is possible to stably improve the magnetic flux density by increasing an inhibitor such as AlN. The nitriding treatment may be an ordinary nitriding treatment, and examples thereof include a treatment of annealing the decarburization-annealed steel sheet in an atmosphere containing a gas having a nitriding capability such as ammonia, a treatment of final-annealing the decarburization-annealed steel sheet to which an annealing separator containing powder having a nitriding capability such as MnN is applied, and the like.

Grain-Oriented Electrical Steel Sheet According to Second Embodiment

Next, a grain-oriented electrical steel sheet according to a second embodiment will be described. The grain-oriented electrical steel sheet according to the second embodiment is a grain-oriented electrical steel sheet having a base steel sheet in which a final-annealed film is substantially not present on a surface, an intermediate layer that is disposed on a surface of the base steel sheet and mainly contains silicon oxide, and an insulation coating disposed on a surface of the intermediate layer. Metallic Fe phases are present in the interface between the intermediate layer and the insulation coating, and, in a cross section perpendicular to a rolling direction, the percentage of the total of the lengths of the metallic Fe phases with respect to the length of the interface is 5% to 50%.

In the grain-oriented electrical steel sheet according to the second embodiment, in a cross section perpendicular to the rolling direction, the length of the metallic Fe phase when the cumulative relative frequency is 0.95 in the cumulative frequency distribution of the lengths of the metallic Fe phases present in the interface may be 500 nm or less.

In the grain-oriented electrical steel sheet according to the second embodiment, the number of Fe-based oxides having a thickness of more than 2 nm may be zero in the interface between the base steel sheet and the intermediate layer. The thickness of the Fe-based oxide refers to the length in a direction perpendicular to the surface of the base steel sheet (the interface between the base steel sheet and the intermediate layer). In addition, the Fe-based oxides refer to $Fe_2O_3$, $Fe_3O_4$, FeO, and $Fe_2SiO_4$.

Hereinafter, the grain-oriented electrical steel sheet according to the second embodiment will be described in detail.

As a result of studying a grain-oriented electrical steel sheet that has a low iron loss and is excellent in terms of the adhesion of an insulation coating and a method for manufacturing the same, the present inventors found that the adhesion of the insulation coating can be improved by controlling the cooling condition of a cooling procedure of a final annealing process and the annealing condition of a process of forming the intermediate layer.

The present inventors found that, in a final-annealed steel sheet obtained by preferably controlling the cooling condition of the cooling procedure of the final annealing process, an appropriate amount of a Fe-based oxide coating is formed on the surface of the final-annealed steel sheet. In addition, the present inventors found that, in the process of forming the intermediate layer, Fe in the Fe-based oxide coating is reduced and thereby an intermediate layer mainly containing silicon oxide is formed, after a process of forming the insulation coating, metallic Fe phases are generated in the interface between the intermediate layer and the insulation coating, and, particularly in a case where these metallic Fe phases are fine, the adhesion of the insulation coating further improves.

Figure 3:
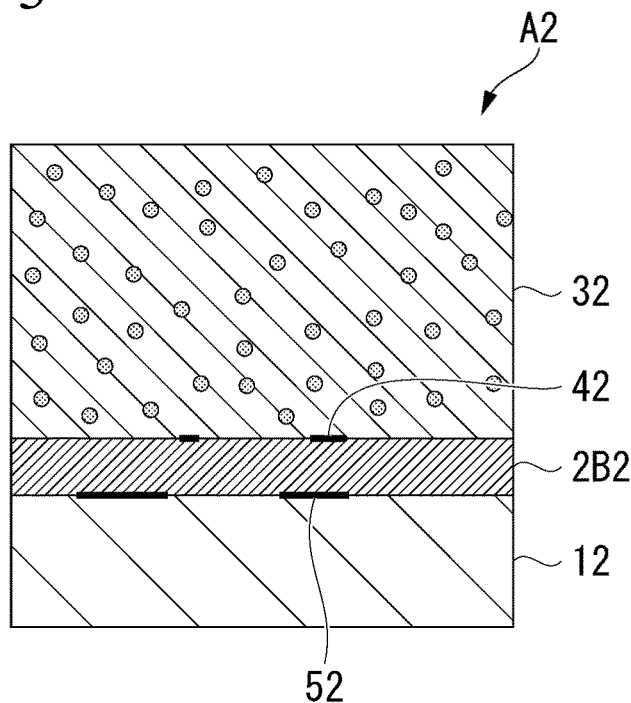
FIG. 3 is a view schematically showing a coating structure of a grain-oriented electrical steel sheet according to a second embodiment.

FIG. 3 is a view schematically showing a coating structure when a cross section perpendicular to a rolling direction is seen regarding a grain-oriented electrical steel sheet A2 according to the second embodiment. The grain-oriented electrical steel sheet A2 according to the second embodiment has an intermediate layer 2B2 mainly containing silicon oxide and an insulation coating 32 on a surface of a base steel sheet 12.

Metallic Fe phases 42 are present in the interface between the intermediate layer 2B2 and the insulation coating 32 in the grain-oriented electrical steel sheet A2 according to the second embodiment. As shown in FIG. 3, when a cross section of the grain-oriented electrical steel sheet A2 according to the second embodiment perpendicular to the rolling direction is observed, the fragment-like metallic Fe phases 42 are observed to be continuously present along the interface between the intermediate layer 2B2 and the insulation coating 32.

In a method for manufacturing the grain-oriented electrical steel sheet A2 according to the second embodiment, an appropriate amount of the Fe-based oxides are formed on the surface of a final-annealed steel sheet in a final annealing process. After that, in the process of forming the intermediate layer (intermediate layer forming process or intermediate layer and insulation coating forming process), Fe in the Fe-based oxides is reduced and replaced by Si, whereby the intermediate layer 2B2 mainly containing silicon oxide is formed. Therefore, the intermediate layer 2B2 having excellent adhesion to the base steel sheet 12 is formed.

When the Fe-based oxides are excessively formed on the surface of the final-annealed steel sheet, in the end, coarse metallic Fe phases 42 are formed in the interface between the intermediate layer 2B2 and the insulation coating 32, and it is not possible to improve the adhesion of the insulation coating 32. When the Fe-based oxides are more excessively formed on the surface of the final-annealed steel sheet, it is not possible for all of the Fe-based oxides to be replaced by the intermediate layer 2B2, and there is a case where Fe-based oxides 52 remain in the interface between the intermediate layer 2B2 and the base steel sheet 12. The Fe-based oxides 52 that remain as described above significantly deteriorate the adhesion of the insulation coating 32.

Therefore, during the final annealing process in the middle of manufacturing, it is necessary for an appropriate amount of Fe-based oxides, specifically, Fe-based oxides having a thickness of 10 to 100 nm, to be formed on the surface of the final-annealed steel sheet.

That is, the final-annealed steel sheet in the middle of the manufacturing of the grain-oriented electrical steel sheet A2 according to the second embodiment needs to include a base steel sheet and a Fe-based oxide coating disposed on the surface of the base steel sheet, and the thickness of the Fe-based oxide coating needs to be 10 nm to 100 nm.

The thickness mentioned herein refers to the length in a direction perpendicular to the surface of the final-annealed steel sheet. When the thicknesses of the Fe-based oxides are less than 10 nm, there is a case where it is not possible to form the intermediate layer 2B2. When the thicknesses of the Fe-based oxides are more than 100 nm, as mentioned above, there are cases where the coarse metallic Fe phases 42 are formed in the interface between the intermediate layer 2B2 and the insulation coating 32 and where the Fe-based oxides 52 remain in the interface between the intermediate layer 2B2 and the base steel sheet 12. Therefore, the final-annealed steel sheet preferably has Fe-based oxides having a thickness of 10 to 100 nm on the surface.

In the grain-oriented electrical steel sheet A2 obtained by forming the intermediate layer 2B2 and the insulation coating 32 on the final-annealed steel sheet, it is preferable that the Fe-based oxides 52 are not substantially present in the interface between the base steel sheet 12 and the intermediate layer 2B2 in order to further improve the adhesion of the insulation coating 32. When the number of the Fe-based oxides 52 having a thickness of more than 2 nm is zero, it is possible to regard the Fe-based oxides 52 as not substantially present. Therefore, in the grain-oriented electrical steel sheet A2, the number of the Fe-based oxides 52 having a thickness of more than 2 nm is preferably set to zero in the interface between the base steel sheet 12 and the intermediate layer 2B2.

The presence or absence of the Fe-based oxides 52 having a thickness of more than 2 nm in the interface between the base steel sheet 12 and the intermediate layer 2B2 can be confirmed by identifying Fe-based oxides using electron beam diffraction with a TEM. In a cross section of the grain-oriented electrical steel sheet A2 perpendicular to the rolling direction, the diameter of the electron beam is set to 10 nm, an electron beam diffraction image oriented in a direction perpendicular to the surface of the grain-oriented electrical steel sheet 2A from the inside of the base steel sheet 12 is acquired, and the presence or absence of the Fe-based oxides 52 having a thickness of more than 2 nm is confirmed. In a case where the Fe-based oxides 52 are present in the interface between the base steel sheet 12 and the intermediate layer 2B2, regions in which an electron beam diffraction image of the Fe-based oxide 52 is obtained are continuously present in a region in which an electron beam diffraction image of the base steel sheet 12 is obtained.

In a case where the Fe-based oxides 52 are not present in the interface, a region in which an electron beam diffraction pattern unique to amorphous substances, from which no clear dot-like electron beam diffraction pattern can be obtained and which is ordinarily called a halo pattern, is obtained appears in a region in which an electron beam diffraction image of the base steel sheet 12 is obtained. The distance from a point at which the electron beam diffraction image of the Fe-based oxide 52 appears to a point at which the electron beam diffraction pattern disappears (the length in a direction perpendicular to the surface of the base steel sheet 12 (the interface between the base steel sheet 12 and the intermediate layer 2B2)) is defined as the thickness of the Fe-based oxide 52. $Fe_2O_3$, $Fe_3O_4$, FeO, and $Fe_2SiO_4$ are determined as the Fe-based oxides 52. The presence or absence of the Fe-based oxides having a thickness of more than 2 nm is confirmed by the above-described method at 10 to 50 sites.

Hereinafter, the three-layer structure of the grain-oriented electrical steel sheet according to the second embodiment and the metallic Fe phases that are observed in the interface between the intermediate layer and the insulation coating will be described. In the following description, reference signs in the drawings will be shown only in a case where the drawings are described.

Intermediate Layer

The intermediate layer is formed on a surface of the base steel sheet and mainly contains silicon oxide. The intermediate layer has a function of adhering the base steel sheet and the insulation coating.

In the grain-oriented electrical steel sheet according to the second embodiment, the intermediate layer refers to a layer present between a base steel sheet described below and an insulation coating described below.

Silicon oxide, which is the main component of the intermediate layer, is preferably $SiO_x$ (x=1.0 to 2.0) and more preferably $SiO_x$ (x=1.5 to 2.0). This is because silicon oxide is more stable. When a heat treatment for forming silicon oxide on the surface of the base steel sheet is sufficiently performed, it is possible to form silica ($SiO_2$).

The expression "mainly containing silicon oxide" means that, as the composition of the intermediate layer, a Fe content of less than 30 atom %, a P content of less than 5 atom %, a Si content of 20 atom % or more, an O content of 50 atom % or more, and a Mg content of 10 atom % or less are satisfied.

When the thickness of the intermediate layer is too thin, a thermal stress relaxation effect is not sufficiently developed, and it is not possible to ensure the adhesion of the insulation coating. Therefore, the thickness of the intermediate layer is preferably 2 nm or more and more preferably 5 nm or more. On the other hand, when the thickness of the intermediate layer is too thick, since the thickness becomes nonuniform and a defect such as a void or a crack is generated in the intermediate layer, the thickness of the intermediate layer is preferably 400 nm or less and more preferably 300 nm or less. In addition, the intermediate layer is made as thin as possible as long as it is possible to ensure the adhesion of the insulation coating, whereby it is possible to contribute to the enhancement of productivity by shortening the formation time and to suppress a decrease in the space factor at the time of using the grain-oriented electrical steel sheet as an iron core. Therefore, the thickness of the intermediate layer is more preferably 100 nm or less or 50 nm or less.

The thickness or position of the intermediate layer can be obtained by observing a cross section of the intermediate layer as described below with a scanning transmission electron microscope (STEM) in which the diameter of an electron beam is set to 10 nm and measuring the thickness or position.

Specifically, a test piece is cut out by focused ion beam (FIB) machining such that the cut surface becomes parallel to the sheet thickness direction and perpendicular to a rolling direction, and the cross-sectional structure of this cut surface is observed with a Scanning-TEM at a magnification at which each layer is included in an observation visual field (light field image). In a case where each layer is not included in the observation visual field, the cross-sectional structure is observed in a plurality of visual fields that are continuous with each other.

In order to specify each layer in the cross-sectional structure, a line analysis is performed along the sheet thickness direction from the surface of the grain-oriented electrical steel sheet using scanning TEM-energy dispersive X-ray spectroscopy (STEM-EDS), and a quantitative analysis is performed on the chemical composition of each layer. On the observation cross section of the specimen, the line analysis is performed at 100 sites at intervals of 0.1 μm in a direction parallel to the surface of the base steel sheet. As the line analysis, a quantitative analysis is performed at intervals of 1 nm in the sheet thickness direction by energy dispersive X-ray spectroscopy (EDS) in which the diameter of an electron beam is set to 10 nm.

Elements to be quantitatively analyzed are five elements of Fe, P, Si, O, and Mg. From the light field image observation with the STEM and the quantitative analysis results of STEM-EDS, the kind of each layer is specified, and the thickness of each layer is measured. Specifically, the kind of each layer is specified according to criteria described below, and the average value of the thicknesses of each layer measured at the 100 sites is calculated to obtain the thickness of each layer. The specification of each layer and the measurement of the thickness described below are all performed on the same scanning line of the same specimen.

A region in which the Fe content is 80 atom % or more is determined as the base steel sheet.

A region in which the Fe content is less than 45 atom %, the P content is 5 atom % or mom, the Si content is less than 20 atom %, the O content is 50 atom % or more, and the Mg content is 10 atom % or less is determined as the insulation coating.

A region satisfying a Fe content of less than 30 atom %, a P content of less than 5 atom %, a Si content of 20 atom % or more, an O content of 50 atom % or more, and a Mg content of 10 atom % or less is determined as the intermediate layer.

When each layer is determined by the chemical composition as described above, there is a case where a region that does not correspond to any compositions in the analysis (blank region) is generated. However, in the grain-oriented electrical steel sheet according to the second embodiment, each layer is specified so as to be included in the three-layer structure of the base steel sheet, the intermediate layer, and the insulation coating. Determination criteria therefor are as described below.

Regarding a blank region between the base steel sheet and the intermediate layer, the center of the blank region (the center in the thickness direction, which shall apply below) is considered as a boundary, the base steel sheet side is regarded as the base steel sheet, and the intermediate layer side is regarded as the intermediate layer. Regarding a blank region between the insulation coating and the intermediate layer, the center of the blank region is considered as a boundary, the insulation coating side is regarded as the insulation coating, and the intermediate layer side is regarded as the intermediate layer.

When the intermediate layer is not present, regarding a blank region between the base steel sheet and the insulation coating, the center of the blank region is regarded as a boundary, the base steel sheet side is regarded as the base steel sheet, and the insulation coating side is regarded as the insulation coating. A blank region, the base steel sheet, and the insulation coating that are present between the intermediate layer and the intermediate layer are regarded as the intermediate layer. A blank region and the insulation coating that are present between the base steel sheet and the base steel sheet is regarded as the base steel sheet. A blank region between the insulation coating and the insulation coating is regarded as the insulation coating.

With this procedure, it is possible to separate the base steel sheet, the insulation coating, and the intermediate layer.

Insulation Coating

The insulation coating is formed on the surface of the intermediate layer 2B2 as shown in FIG. 3 and has a function of reducing the iron loss of the grain-oriented electrical steel sheet A2 as a single sheet by applying tension to the base steel sheet 12 and a function of ensuring an electrical insulating property between the grain-oriented electrical steel sheets A2 at the time of using a laminate of the grain-oriented electrical steel sheets A2.

The insulation coating is not particularly limited, can be appropriately selected and used from well-known insulating coatings depending on uses or the like, and may be any of an organic coating or an inorganic coating.

Examples of the organic coating include a polyamine-based resin, an acrylic resin, an acrylic styrene resin, an alkyd resin, a polyester resin, a silicone resin, a fluororesin, a polyolefin resin, a styrene resin, a vinyl acetate resin, an epoxy resin, a phenolic resin, an urethane resin, a melamine resin, and the like. In addition, examples of the inorganic coating include a phosphate-based coating, an aluminum phosphate-based coating, furthermore, an organic-inorganic complex-based coating containing the above-described resin, or the like. More specifically, the insulation coating may be an insulating coating obtained by baking an insulating coating having colloidal silica particles dispersed in a matrix as shown in FIG. 3. Here, the "matrix" refers to a substrate of the insulation coating and is made from, for example, a non-crystalline phosphate. Examples of the non-crystalline phosphate that configures the matrix include aluminum phosphate, magnesium phosphate, and the like. The baked insulation coating is made up of a plurality of compounds containing one or more of P, O, and S.

When the thickness of the insulation coating is too thin, tension that is applied to the base steel sheet becomes small, and the insulating property also degrades. Therefore, the thickness of the insulation coating is preferably 0.1 μm or more and more preferably 0.5 μm or more. On the other hand, when the thickness of the insulation coating exceeds 10 μm, there is a case where a crack is generated in the insulation coating in an insulation coating forming stage. Therefore, the thickness of the insulation coating is preferably 10 μm or less and more preferably 5 μm or less.

On the insulation coating, a magnetic domain refining treatment for forming a local fine strain region or groove may be performed with a laser or plasma or by a mechanical method, etching, or other methods.

Base Steel Sheet

The chemical composition and configuration such as the structure of the base steel sheet in the grain-oriented electrical steel sheet according to the second embodiment do not have any direct relationship with the coating structure of the grain-oriented electrical steel sheet except that Si and one or more of Sn and Sb are contained as essential components. Therefore, the base steel sheet in the grain-oriented electrical steel sheet according to the second embodiment is not particularly limited as long as the action and effect of the grain-oriented electrical steel sheet according to the second embodiment can be obtained, and it is possible to use, for example, a base steel sheet in an ordinary grain-oriented electrical steel sheet. Hereinafter, the base steel sheet in the grain-oriented electrical steel sheet according to the second embodiment will be described.

Chemical Composition of Base Steel Sheet

As the chemical composition of the base steel sheet, it is possible to use the chemical composition of a base steel sheet in an ordinary grain-oriented electrical steel sheet except that one or more of Sn and Sb and Si are contained as essential components. Since the function of Si in the grain-oriented electrical steel sheet is the same as in ordinary grain-oriented electrical steel sheets, the Si content may be determined within an ordinary range depending on characteristics required for a target grain-oriented electrical steel sheet. In the following description, the unit of the amount of each component in the chemical composition of the base steel sheet is "mass %".

The base steel sheet of the grain-oriented electrical steel sheet according to the second embodiment contains, for example, Si: 0.50% to 7.00%, Sn and Sb: 0.005% to 1.00% in total, C: 0.005% or less, and N: 0.0050% or less, and the remainder is made up of Fe and an impurity. Hereinafter, regarding a typical example of the chemical composition of the base steel sheet of the grain-oriented electrical steel sheet according to the present embodiment, reasons for limiting the chemical composition will be described.

Si: 0.50% to 7.00%

Silicon (Si) increases the electrical resistance of the grain-oriented electrical steel sheet to decrease the iron loss. When the Si content is less than 0.50%, this effect cannot be sufficiently obtained. Therefore, the Si content is preferably 0.50% or more. The Si content is more preferably 1.50% or more and still more preferably 2.50% or more.

On the other hand, when the Si content exceeds 7.00%, the saturation magnetic flux density of the base steel sheet decreases, and the iron loss of the grain-oriented electrical steel sheet deteriorates. Therefore, the Si content is preferably 7.00% or less. The Si content is more preferably 5.50% or less and still more preferably 4.50% or less.

Sn and Sb: 0.005% to 1.00% in total

Sn or Sb is an essential component and an effective component for preferably controlling the forms of the metallic Fe phases. The reason for the forms of the metallic Fe phases being preferably controlled by containing Sn or Sb is not clear, but Sn and Sb are a component having an influence on surface oxidation behaviors through surface segregation. Therefore, it is considered that the forms of the metallic Fe phases can be preferably controlled indirectly by changing the forms of the Fe-based oxides that serve as the origin of the metallic Fe phases. When the total amount of Sn and Sb is 0.005% or less, an effect of preferably controlling the forms of the metallic Fe phases is not obtained. Therefore, the total amount of Sn and Sb is set to 0.005% or more. The total amount of Sn and Sb is preferably 0.10% or more and more preferably 0.30% or more. On the other hand, when the total amount of Sn and Sb exceeds 1.00%, no metallic Fe phases are formed. Therefore, the total amount of Sn and Sb is set to 1.00% or less. The total amount of Sn and Sb is preferably 0.80% or less and more preferably 0.70% or less.

Here, "the amount of Sn and Sb is 0.005% to 1.00% in total" means that the base steel sheet may contain any one of Sn or Sb alone and the amount of any one of Sn or Sb may be 0.005% to 1.00% or the base steel sheet may contain both Sn and Sb and the amount of Sn and Sb may be 0.005% to 1.00% in total.

C: 0.005% or less

Carbon (C) forms a compound in the base steel sheet and deteriorates the iron loss of the grain-oriented electrical steel sheet. Therefore, the C content is preferably 0.005% or less. The C content is more preferably 0.004% or less and still more preferably 0.003% or less.

On the other hand, the C content is preferably as small as possible and thus may be 0%, but there is a case where C is contained in steel as an impurity. Therefore, the C content may be more than 0%.

N: 0.0050% or less

Nitrogen (N) forms a compound in the base steel sheet and deteriorates the iron loss of the grain-oriented electrical steel sheet. Therefore, the N content is preferably 0.0050% or less. The N content is more preferably 0.0040% or less and still more preferably 0.0030% or less.

On the other hand, the N content is preferably as small as possible and thus may be 0%, but there is a case where N is contained in steel as an impurity. Therefore, the N content may be more than 0%.

The remainder of the chemical composition of the base steel sheet is made up of Fe and an impurity. The "impurity" mentioned herein refers to an element that comes from a component contained in a raw material or a component being mixed in a manufacturing procedure at the time of industrially manufacturing the base steel sheet and has no substantial influence on an effect that is obtained by the grain-oriented electrical steel sheet according to the present embodiment.

[Optional Elements]

Basically, the chemical composition of the base steel sheet contains the above-described elements with the remainder made up of Fe and an impurity, but may contain one or more optional elements instead of some of Fe for the purpose of improving the magnetic properties or solving problems relating to manufacturing. Examples of the optional elements that are contained instead of some of Fe include the following elements. Since these elements may not be contained, the lower limits are 0%. On the other hand, when the amounts of these elements are too large, a precipitate is generated, thereby deteriorating the iron loss of the grain-oriented electrical steel sheet or ferrite transformation is suppressed to prevent the sufficient obtainment of a Goss orientation or to decrease the saturation magnetic flux density, thereby deteriorating the iron loss of the grain-oriented electrical steel sheet. Therefore, even in a case where these elements are contained, the contents are preferably set within the following ranges.

Acid-soluble Al: 0.0065% or less,
Mn: 1.00% or less,
S and Se: 0.001% or less in total,
Bi: 0.010% or less,
B: 0.0080% or less,
Ti: 0.015% or less,
Nb: 0.020% or less,
V: 0.015% or less,
Cr: 0.30% or less,
Cu: 0.40% or less,
P: 0.50% or less, Ni: 1.00% or less, and Mo: 0.10% or less.

"S and Se: 0.001% or less in total" means that the base steel sheet may contain any one of S or Se alone and the amount of any one of S or Se may be 0.001% or less or the base steel sheet may contain both S and Se and the amount of S and Se may be 0.001% or less in total.

The above-described chemical composition of the base steel sheet of the grain-oriented electrical steel sheet according to the present embodiment is obtained by adopting a method for manufacturing the grain-oriented electrical steel sheet according to the present embodiment using a slab having a chemical composition described below.

The chemical composition of the base steel sheet of the grain-oriented electrical steel sheet according to the present embodiment is preferably measured using spark optical emission spectrometry (Spark-OES). In addition, in the case of a small content, the content may be measured using inductively coupled plasma-atomic emission spectrometry (ICP-AES). Acid-soluble Al may be measured by ICP-MS using a filtrate obtained by hydrolyzing a specimen with an acid. In addition, C and S may be measured using an infrared absorption method after combustion, and N may be measured using an inert gas fusion thermal conductivity method.

Metallic Fe Phases Present in Interface Between Intermediate Layer and Insulation Coating Regarding the metallic Fe phases present in the interface between the intermediate layer and the insulation coating, the present inventors found that the adhesion of the insulation coating improves in a case where the percentage of the total of the lengths of the metallic Fe phases with respect to the length of the interface is 5% to 50% in a cross section perpendicular to the rolling direction of the grain-oriented electrical steel sheet. The percentage of the total of the lengths of the metallic Fe phases with respect to the length of the interface can also be expressed as the linear fraction of the metallic Fe phases (="total of lengths of metallic Fe phases"/"length of interface between intermediate layer and insulation coating"×100).

The length mentioned herein refers to the maximum length in a direction parallel to the interface between the base steel sheet and the intermediate layer.

The linear fraction of the metallic Fe phases present in the interface between the intermediate layer and the insulation coating is the degree of the interface between the intermediate layer and the insulation coating occupied by the metallic Fe phases that is expressed using a cross-sectional profile perpendicular to the rolling direction. As the value of the linear fraction of the metallic Fe phases increases, the occupancy of the metallic Fe phases in the interface between the intermediate layer and the insulation coating increases, and the adhesion of the insulation coating is more likely to deteriorate. Therefore, the linear fraction of the metallic Fe phases is preferably set to be small in order to improve the adhesion of the insulation coating. Therefore, in the grain-oriented electrical steel sheet according to the second embodiment, the linear fraction of the metallic Fe phases is set to 50% or less. The linear fraction of the metallic Fe phases is preferably 40% or less, more preferably 35% or less, and still more preferably 25% or less.

In the grain-oriented electrical steel sheet according to the second embodiment, in the case of forming the intermediate layer and the insulation coating on a final-annealed steel sheet in which the Fe-based oxides are present, the metallic Fe phases are inevitably formed in a linear fraction of 5% or more. Therefore, in the grain-oriented electrical steel sheet according to the second embodiment, the linear fraction of the metallic Fe phases is set to 5% or more.

Method for Measuring Linear Fraction of Metallic Fe Phases

First, on a cross section perpendicular to the rolling direction, the lengths of a region that is 1000 µm or longer in the sheet width direction and 10 or more metallic Fe phases are measured with a SEM. The metallic Fe phases can be determined using a reflected electron image that is obtained by observing a cross section of the grain-oriented electrical steel sheet perpendicular to the rolling direction with a SEM. The reflected electron image is converted to a monochromatic image with 256 levels of grayscale, and regions having ±20% grayscale levels of the average grayscale level of the base steel sheet are determined as metallic Fe. Among the regions determined as metallic Fe, regions that are not continuous with the base steel sheet are defined as the metallic Fe phases. This is because the measurement target is the metallic Fe phases present in the interface between the intermediate layer and the insulation coating. The monochromatic image is converted to a binarized image using a 30% grayscale level from the white side as a threshold value, and a white region is defined as the base steel sheet.

The total of the obtained lengths of the metallic Fe phases is calculated, thereby obtaining the total of the lengths of the metallic Fe phases present in the interface between the intermediate layer and the insulation coating. The obtained total of the lengths of the metallic Fe phases is divided by the length of the observation region in the sheet width direction, thereby obtaining the percentage of the total of the lengths of the metallic Fe phases with respect to the length of the interface between the intermediate layer and the insulation coating in the cross section perpendicular to the rolling direction. Length of metallic Fe phase when cumulative relative frequency is 0.95 The present inventors found that a parameter having a correlation with the adhesion of the insulation coating is not the average value and/or central value of the lengths of the metallic Fe phases but the length of the metallic Fe phase when the cumulative relative frequency is 0.95 in the cumulative frequency distribution of the lengths of the metallic Fe phases. The present inventors found that it is possible to enhance the adhesion of the insulation coating by controlling the length of the metallic Fe phase when the cumulative relative frequency is 0.95 to 500 nm or less in a cross section perpendicular to the rolling direction.

That is, in a cross section of the grain-oriented electrical steel sheet according to the second embodiment perpendicular to the rolling direction, the length of the metallic Fe phase when the cumulative relative frequency is 0.95 in the cumulative frequency distribution of the lengths of the metallic Fe phases present in the interface between the intermediate layer and the insulation coating is preferably 500 nm or less. The length of the metallic Fe phase when the cumulative relative frequency is 0.95 is preferably as small as possible, but may be set to 50 nm or more.

Frequencies of metallic Fe phases are obtained every 25 nm in length, and the cumulative frequency distribution of the lengths of the metallic Fe phases is obtained.

The length of the metallic Fe phase when the cumulative relative frequency is 0.95 being 500 nm or less can also be said in a different manner as described below.

A distribution showing the number of metallic Fe phases every 25 nm in length is obtained for the metallic Fe phases present in the interface between the intermediate layer and the insulation coating in a cross section perpendicular to the rolling direction, the numbers of the metallic Fe phases are sequentially added from the short length side based on this distribution, and the cumulative frequency distribution is specified. In the obtained cumulative frequency distribution, the length at which the number of the metallic Fe phases reaches 95% of the total number is 500 nm or less.

In a case where metallic Fe phases having a long length in the sheet thickness direction are included in the interface between the intermediate layer and the insulation coating, adverse influences on the adhesion of the insulation coating are significant. In the grain-oriented electrical steel sheet according to the second embodiment, the length of the metallic Fe phase when the cumulative relative frequency is 0.95 is set to 500 nm or less, whereby no large metallic Fe phases are present in the interface between the intermediate layer and the insulation coating or, even when present, the number of large metallic Fe phases is small, and thus it is possible to further improve the adhesion of the insulation coating.

Figure 4:
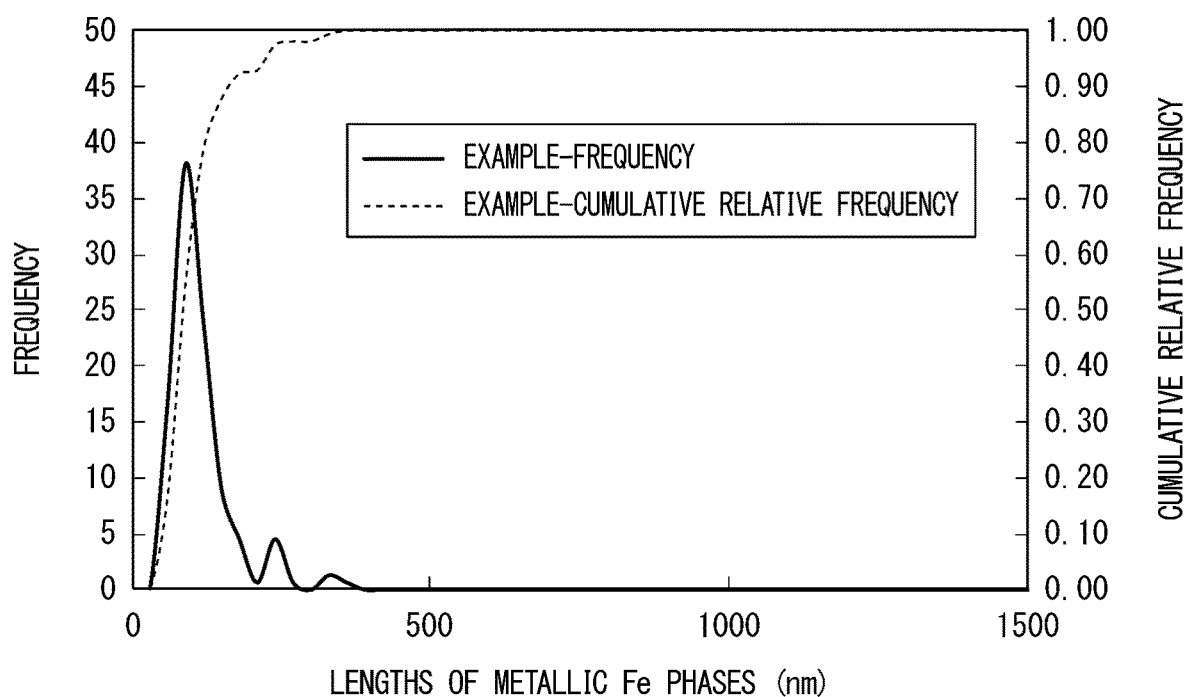
FIG. 4 is a graph showing a relationship of lengths of metallic Fe phases with frequencies and cumulative relative frequencies of metallic Fe phases in the grain-oriented electrical steel sheet according to the second embodiment.
Figure 6:
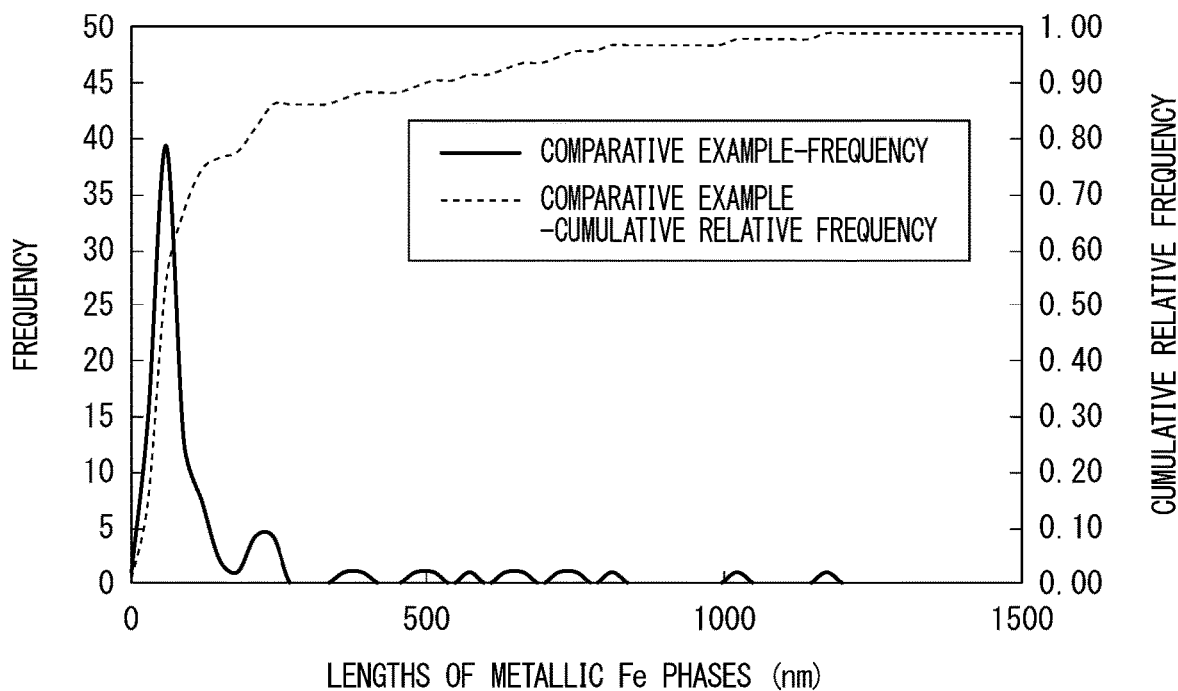
FIG. 6 is a graph showing a relationship among lengths, frequencies, and cumulative relative frequencies of metallic Fe phases in a grain-oriented electrical steel sheet corresponding to the related art.

FIG. 4 and FIG. 6 show examples of the relationship of the lengths of the metallic Fe phases with frequencies and cumulative relative frequencies of the metallic Fe phases present in the interface between the intermediate layer and the insulation coating of the grain-oriented electrical steel sheet. The lengths (lengths in a direction parallel to the interface) of the metallic Fe phases present in the interface between the intermediate layer and the insulation coating can be measured using a reflected electron image that is obtained by observing a cross section of the grain-oriented electrical steel sheet perpendicular to the rolling direction with a scanning electron microscope (SEMI). The reflected electron image is converted to a monochromatic image with 256 levels of grayscale, and regions having ±20% grayscale levels of the average grayscale level of the base steel sheet are determined as metallic Fe. Among the regions determined as metallic Fe, regions that are not continuous with the base steel sheet are defined as the metallic Fe phases. This is because the measurement target is the metallic Fe phases present in the interface between the intermediate layer and the insulation coating.

The monochromatic image is converted to a binarized image using a 30% grayscale level from the white side as a threshold value, and a white region is defined as the base steel sheet.

The length of the metallic Fe phase is defined as the maximum length in a direction parallel to the interface between the base steel sheet and the intermediate layer. In addition, from the measurement values of the lengths of the metallic Fe phases, it is possible to obtain a graph (cumulative frequency distribution) showing the relationship of the lengths of the metallic Fe phases with frequencies and cumulative relative frequencies of the metallic Fe phases present in the interface between the intermediate layer and the insulation coating as shown in FIG. 4 and FIG. 6.

In the method for measuring the lengths of the metallic Fe phases for preparing the cumulative frequency distribution, the lengths of a region that is 1000 μm or longer in the sheet width direction and 10 or more metallic Fe phases are measured with a SEM in a cross section perpendicular to the rolling direction.

FIG. 4 is a graph (cumulative frequency distribution) showing a relationship among the lengths of the metallic Fe phases in the grain-oriented electrical steel sheet according to the second embodiment, the frequencies and cumulative relative frequencies of the lengths of the metallic Fe phases. In contrast, FIG. 6 is a graph (cumulative frequency distribution) showing a relationship among the lengths of the metallic Fe phases in a grain-oriented electrical steel sheet corresponding to the related art, the frequencies and cumulative relative frequencies of the lengths of the metallic Fe phases.

FIG. 6 and FIG. 4 are rarely different from each other in terms of the average value and central value of the lengths of the metallic Fe phases. However, while the length of the metallic Fe phase when the cumulative relative frequency is 0.95 is 500 nm or less in FIG. 4, the length of the metallic Fe phase when the cumulative relative frequency is 0.95 exceeds 500 nm in FIG. 6.

Method for Manufacturing Grain-Oriented Electrical Steel Sheet According to Second Embodiment Next, a method for manufacturing the grain-oriented electrical steel sheet according to the second embodiment will be described.

The method for manufacturing the grain-oriented electrical steel sheet described below is a method for manufacturing the grain-oriented electrical steel sheet described in the section of "the grain-oriented electrical steel sheet according to the second embodiment".

The method for manufacturing the grain-oriented electrical steel sheet according to the second embodiment is classified into a manufacturing method according to a first example in which the intermediate layer and the insulation coating are formed in separate processes and a manufacturing method according to a second example in which the intermediate layer and the insulation coating are formed in one process.

The manufacturing method according to the first example, in which the intermediate layer and the insulation coating are formed in separate processes, includes
   a hot rolling process of heating a slab and then performing hot rolling to obtain a hot-rolled steel sheet,
   a hot-band annealing process of performing hot band annealing on the hot-rolled steel sheet to obtain an annealed steel sheet, and
   a cold rolling process of performing cold rolling on the annealed steel sheet once or twice or more with intermediate annealing performed therebetween to obtain a cold-rolled steel sheet.

In addition, the manufacturing method according to the first example includes
   a decarburization annealing process of performing decarburization annealing on the cold-rolled steel sheet to obtain a decarburization-annealed steel sheet and
   a final annealing process of heating the decarburization-annealed steel sheet with an annealing separator having a MgO content of 10 mass % to 50 mass % applied to a surface of the decarburization-annealed steel sheet to a temperature range of 1000° C. or higher to perform final annealing and then removing the annealing separator to obtain a final-annealed steel sheet.

In a cooling procedure after heating the decarburization-annealed steel sheet to the temperature range of 1000° C. or higher, T1 is set to 1100° C. in a case where the final annealing temperature is 1100° C. or higher and T1 is set to the final annealing temperature in a case where the final annealing temperature is lower than 1100° C., and the decarburization-annealed steel sheet is cooled within a temperature range of T1 to 500° C. in an atmosphere having an oxidation degree ($P_{H2O}/P_{H2}$) of 0.3 to 100000.

Furthermore, the manufacturing method according to the first example includes an intermediate layer forming process of annealing on the final-annealed steel sheet to form an intermediate layer mainly containing silicon oxide on the surface and an insulation coating forming process of applying a coating solution to the surface of the intermediate layer and baking the coating solution to form an insulation coating.

Next, the manufacturing method according to the second example, in which the intermediate layer and the insulation coating are formed in one process at the same time, includes
- a hot rolling process of heating a slab and then performing hot rolling to obtain a hot-rolled steel sheet,
- a hot-band annealing process of performing hot band annealing on the hot-rolled steel sheet to obtain an annealed steel sheet, and
- a cold rolling process of performing cold rolling on the annealed steel sheet once or twice or more with intermediate annealing performed therebetween to obtain a cold-rolled steel sheet.

In addition, the manufacturing method according to the second example form includes
- a decarburization annealing process of performing decarburization annealing on the cold-rolled steel sheet to obtain a decarburization-annealed steel sheet and
- a final annealing process of heating the decarburization-annealed steel sheet with an annealing separator having a MgO content of 10 mass % to 50 mass % applied to a surface of the decarburization-annealed steel sheet to a temperature range of 1000° C. or higher to perform final annealing and then removing the annealing separator to obtain a final-annealed steel sheet.

In a cooling procedure after heating the decarburization-annealed steel sheet to the temperature range of 1000° C. or higher, T1 is set to 1100° C. in a case where the final annealing temperature is 1100° C. or higher and T1 is set to the final annealing temperature in a case where the final annealing temperature is lower than 1100° C., and the decarburization-annealed steel sheet is cooled within a temperature range of T1 to 500° C. in an atmosphere having an oxidation degree ($P_{H2O}/P_{H2}$) of 0.3 to 100000.

Furthermore, the manufacturing method according to the second example includes
- an intermediate layer and insulation coating forming process of applying a coating solution to the surface of the final-annealed steel sheet and annealing the final-annealed steel sheet to form an intermediate layer mainly containing silicon oxide and an insulation coating.

The method for manufacturing the grain-oriented electrical steel sheet according to the second embodiment, which is made up of the manufacturing method according to the first example and the manufacturing method according to the second example, is characterized particularly in that the hindrance of the iron loss reduction action of the insulation coating due to interfacial unevenness between the final-annealed film and the base steel sheet is avoided, the intermediate layer mainly containing silicon oxide is formed in order to ensure the adhesion between the insulation coating and the base steel sheet attributed to the intermediate layer, and the fine metallic Fe phases are formed in the interface between the intermediate layer and the insulation coating. Therefore, particularly characteristic processes are the processes of forming the intermediate layer (the intermediate layer forming process in the manufacturing method according to the first example and the intermediate layer and insulation coating forming process in the manufacturing method according to the second example) and the final annealing process. In addition, in the method for manufacturing the grain-oriented electrical steel sheet according to the second embodiment, the chemical composition of the slab is also a characteristic.

First, the chemical composition of the slab in the method for manufacturing the grain-oriented electrical steel sheet according to the second embodiment will be described. The chemical composition of the slab is common in the manufacturing method according to the first example and in the manufacturing method according to the second example.

A typical example of the chemical composition of the slab is as described below.

The chemical composition contains, by mass %,
Si: 0.80% to 7.00%,
Sn and Sb: 0.005% to 1.00% in total
C: 0.085% or less,
acid-soluble Al: 0.010% to 0.065%,
N: 0.004% to 0.012%,
Mn: 0.05% to 1.00%, and
S and Se: 0.003% to 0.015% in total
with a remainder being made up of Fe and an impurity.

Hereinafter, reasons for limiting the typical example of the chemical composition will be described. "%" used to express the content of each element in the chemical composition of the slab indicates "mass %" unless particularly otherwise described. Numerical limitation ranges expressed using "to" in the middle include the lower limit value and the upper limit value in the ranges.

Si: 0.80% to 7.00%

Si is an essential component and increases the electrical resistance to reduce the iron loss of the grain-oriented electrical steel sheet. In addition, when Si is contained in a high concentration, a strong chemical affinity is developed between the intermediate layer mainly containing silicon oxide and the base steel sheet, and the intermediate layer and the base steel sheet adhere to each other more strongly. However, when the Si content exceeds 7.00%, cold rolling becomes extremely difficult, and a crack is likely to be generated during cold rolling. Therefore, the Si content is preferably set to 7.00% or less. The Si content is more preferably 4.50% or less and still more preferably 4.00% or less. On the other hand, when Si content is less than 0.80%, γ transformation occurs during final annealing, and the crystal orientation of the grain-oriented electrical steel sheet is impaired. Therefore, the Si content is preferably set to 0.80% or more. The Si content is more preferably 2.00% or more and still more preferably 2.50% or more.

Sn and Sb: 0.005% to 1.00% in total

Sn or Sb is an essential component and an effective component for controlling the forms of the metallic Fe phases. The reason for the forms of the metallic Fe phases being preferably controlled by containing Sn or Sb is not clear, but Sn and Sb are a component having an influence on surface oxidation behaviors through surface segregation. Therefore, it is considered that the forms of the metallic Fe phases can be preferably controlled indirectly by changing the forms of the Fe-based oxides that serve as the origin of the metallic Fe phases. When the total amount of Sn and Sb is 0.005% or less, an effect of enabling the preferable control of the forms of the metallic Fe phases is not developed. Therefore, the total amount of Sn and Sb is set to 0.005% or more. The total amount of Sn and Sb is preferably 0.10% or more and more preferably 0.30% or more. On the other hand, when the total amount of Sn and Sb exceeds 1.00%, no metallic Fe phases are formed. Therefore, the total amount of Sn and Sb is set to 1.00% or less. The total amount of Sn and Sb is preferably 0.80% or less and more preferably 0.70% or less.

Here, "the amount of Sn and Sb is 0.005% to 1.00% in total" means that the slab may contain any one of Sn or Sb alone and the amount of any one of Sn or Sb may be 0.005% to 1.00% or the slab may contain both Sn and Sb and the amount of Sn and Sb may be 0.005% to 1.00% in total.

C: 0.085% or less

C is an effective element for controlling primary recrystallization structures, but adversely affects the magnetic properties of the grain-oriented electrical steel sheet. Therefore, in the method for manufacturing the grain-oriented electrical steel sheet according to the first embodiment, decarburization annealing is performed before final annealing. When the C content exceeds 0.085%, the decarburization annealing time becomes long, and the productivity in industrial production is impaired. Therefore, the C content is preferably set to 0.085% or less. The lower limit of the C content is not particularly limited, but the C content is more preferably 0.020% or more and still more preferably 0.050% or more.

C is purified in the decarburization annealing process and the final annealing process, which will be described below, and the C content reaches 0.005% or less after the final annealing process. Depending on the conditions of the decarburization annealing process and final annealing, there is a case where the final-annealed steel sheet contains no C.

Acid-soluble Al: 0.010% to 0.065%

Acid-soluble Al bonds with N to be precipitated as (Al, Si)N. This precipitate functions as an inhibitor. In a case where the acid-soluble Al content is 0.010% to 0.065%, secondary recrystallization is stabilized. Therefore, the acid-soluble Al content is preferably set to 0.010% to 0.065%. The acid-soluble Al content is more preferably 0.020% or more and still more preferably 0.025% or more. In addition, from the viewpoint of the stability of secondary recrystallization, the acid-soluble Al content is more preferably 0.040% or less and still more preferably 0.030% or less.

Since acid-soluble Al is purified in the final annealing process, depending on the conditions of final annealing, there is a case where the final-annealed steel sheet contains no acid-soluble Al.

N: 0.004% to 0.012%

N bonds with Alto function as an inhibitor. When the N content is less than 0.004%, it is not possible to obtain a sufficient amount of an inhibitor. Therefore, the N content is preferably set to 0.004% or more. The N content is more preferably 0.006% or more and still more preferably 0.007% or more. On the other hand, when the N content is more than 0.012%, a defect called a blister is likely to be generated in the steel sheet. Therefore, the N content is preferably set to 0.012% or less. The N content is more preferably 0.010% or less and still more preferably 0.009% or less. Since N is purified in the final annealing process, depending on the conditions of final annealing, there is a case where the final-annealed steel sheet contains no N.

Mn: 0.05% to 1.00%

S and Se: 0.003% to 0.015% in total

Mn generates MnS and MnSe together with S and Se. These composite compounds function as an inhibitor. In a case where the Mn content is 0.05% to 1.00%, secondary recrystallization is stabilized. Therefore, the Mn content is preferably set to 0.05% to 1.00%. The Mn content is more preferably 0.08% or more and still more preferably 0.09% or more. In addition, the Mn content is more preferably 0.50% or less and still more preferably 0.20% or less.

In a case where the amount of S and Se is 0.003% to 0.015% in total, secondary recrystallization is stabilized. Therefore, the amount of S and Se is preferably set to 0.003% to 0.015% in total.

Here, "the amount of S and Se is 0.003% to 0.015% in total" means that the slab may contain any one of S or Se alone and the amount of any one of S or Se may be 0.003% to 0.015% or the slab may contain both S and Se and the amount of S and Se may be 0.003% to 0.015% in total.

Remainder

The remainder is made up of Fe and an impurity. The "impurity" refers to an element that comes from a component contained in a raw material or a component being mixed in a manufacturing procedure at the time of industrially manufacturing the slab.

Optional elements

In consideration of the strengthening of the inhibitor function or the influence on the magnetic properties attributed to the formation of a compound, it is possible to contain a variety of kinds of optional elements instead of some of Fe that is the remainder according to well-known documents. Examples of the optional elements that are contained instead of some of Fe include the following elements. These elements are optional elements and may not be contained, and thus the lower limits thereof are 0%.

Bi: 0.010% or less,
B: 0.080% or less,
Ti: 0.015% or less,
Nb: 0.20% or less,
V: 0.15% or less,
Cr: 0.30% or less,
Cu: 0.40% or less,
P: 0.50% or less,
Ni: 1.00% or less, and
Mo: 0.10% or less.

Hereinafter, regarding individual processes in the method for manufacturing the grain-oriented electrical steel sheet according to the second embodiment, processes in the manufacturing method according to the first example and processes in the manufacturing method according to the second example will be described separately.

Hereinafter, as the conditions of processes other than the above-described particularly characteristic processes (the processes of forming the intermediate layer (the intermediate layer forming process in the manufacturing method according to the frst example and the intermediate layer and insulation coating forming process in the manufacturing method according to the second example) and the final annealing process), ordinary conditions will be described as an example. Therefore, even when the ordinary conditions are not satisfied, it is still possible to obtain the effect of the grain-oriented electrical steel sheet according to the second embodiment.

In the manufacturing method according to the first example, it is possible to form fine metallic Fe phases in preferable forms in the interface between the insulation coating and the intermediate layer by preferably controlling the final annealing process and the intermediate layer forming process.

In the manufacturing method according to the second example, it is possible to form fine metallic Fe phases in preferable forms in the interface between the insulation coating and the intermediate layer by preferably controlling the final annealing process and the intermediate layer and insulation coating forming process.

Manufacturing Method According to First Example

Hot Rolling Process

In the hot rolling process, ordinarily, the slab is heated within a temperature range of 800° C. to 1300° C. and then hot-rolled, thereby obtaining a hot-rolled steel sheet. Examples of the chemical composition of the slab include the above-described chemical composition of the slab.

The slab is obtained by, for example, melting steel having the above-described chemical composition in a converter, an electric furnace, or the like, performing a vacuum degassing treatment as necessary, and then performing continuous casting or ingot casting and blooming. The thickness of the slab is not particularly limited, but is, for example, preferably 150 mm to 350 mm and more preferably 220 mm to 280 mm. In addition, the slab may have a thickness of approximately 10 mm to 70 mm (so-called "thin slab"). In the case of using a thin slab, it is possible to skip rough rolling before final rolling in the hot rolling process.

The heating temperature of the slab is preferably set to 1200° C. or lower since it is possible to avoid, for example, a variety of problems generated in the case of heating the slab at, for example, a temperature higher than 1200° C. (a necessity of a designated heating furnace, a large amount of molten scale, and the like).

In a case where the heating temperature of the slab is too low, there is a case where hot rolling becomes difficult and the productivity degrades. Therefore, the heating temperature of the slab is preferably set to 950° C. or higher. In addition, it is also possible to skip the slab heating process and begin hot rolling until the temperature of the slab lowers after casting.

The heating time of the slab may be set to 40 minutes to 120 minutes.

In the hot rolling process, rough rolling is performed on the heated slab, and final rolling is further performed thereon, thereby producing a hot-rolled steel sheet having a predetermined thickness. After the completion of final rolling, the hot-rolled steel sheet is coiled at a predetermined temperature.

In addition, the sheet thickness of the hot-rolled steel sheet is not particularly limited, but is preferably set to, for example, 3.5 mm or less.

Hot-Band Annealing Process

In the hot-band annealing process, hot band annealing is performed on the hot-rolled steel sheet, thereby obtaining an annealed steel sheet. As hot band annealing conditions, ordinary conditions may be adopted, and it is preferable to set, for example, the annealing temperature (the furnace temperature of a hot band annealing furnace) to 750° C. to 1200° C. and the annealing time (the dwell time in the hot band annealing furnace) to 30 seconds to 600 seconds as the conditions. The hot-rolled steel sheet may be quenched after being held under the above-described conditions.

Cold Rolling Process

In the cold rolling process, cold rolling is performed on the annealed steel sheet once or twice or more with intermediate annealing performed therebetween to obtain a cold-rolled steel sheet. A pickling treatment may be performed on the annealed steel sheet before cold rolling on the annealed steel sheet.

In the case of performing the cold rolling process a plurality of times without performing an intermediate annealing process, there is a case where it is difficult to obtain uniform characteristics in the manufactured grain-oriented electrical steel sheet. On the other hand, in the case of performing the cold rolling process a plurality of times with an intermediate annealing process performed therebetween, there is a case where the magnetic flux density decreases in the manufactured grain-oriented electrical steel sheet. Therefore, the number of times of the cold rolling process and the presence or absence of the intermediate annealing process are determined depending on characteristics demanded for the finally manufactured grain-oriented electrical steel sheet and the manufacturing costs.

The cold rolling reduction in the final cold rolling (final cold rolling reduction) in cold rolling performed once or a plurality of times is not particularly limited, but is preferably set to 80% or larger and more preferably 90% or larger from the viewpoint of crystal orientation control.

The cold-rolled steel sheet obtained by the cold rolling process is wound in a coil shape. The sheet thickness of the cold-rolled steel sheet is not particularly limited, but is preferably set to 0.35 mm or less and more preferably set to 0.30 mm or less in order to further reduce the iron loss of the grain-oriented electrical steel sheet.

Decarburization Annealing Process

In the decarburization annealing process, it is preferable to perform decarburization annealing on the cold-rolled steel sheet to obtain a decarburization-annealed steel sheet. Specifically, decarburization annealing is performed, thereby causing primary recrystallization in the cold-rolled steel sheet and removing C contained in the cold-rolled steel sheet. Decarburization annealing is preferably performed in a wet atmosphere containing hydrogen and nitrogen in order to remove C. As decarburization annealing conditions, it is preferable to set, for example, the decarburization annealing temperature (the temperature of a furnace in which decarburization annealing is performed) to 800° C. to 950° C. and the decarburization annealing time to 30 seconds to 180 seconds.

Final annealing process

In the final annealing process, final annealing is performed by heating the decarburization-annealed steel sheet with an annealing separator applied thereto. With the final annealing, secondary recrystallization is caused in the decarburization-annealed steel sheet.

In ordinary methods for manufacturing grain-oriented electrical steel sheets, a final annealing process is performed by, ordinarily, applying an annealing separator having a high magnesium concentration (for example, MgO≥90%) to the surface of the decarburization-annealed steel sheet in order to form a final-annealed film mainly containing forsterite ($Mg_2SiO_4$). Ordinarily, the annealing separator is applied not only to prevent seizure between final-annealed steel sheets but also to form a final-annealed film made from forsterite ($Mg_2SiO_4$).

In contrast, in the final annealing process of the method for manufacturing the grain-oriented electrical steel sheet according to the second embodiment, the final annealing is performed by heating the decarburization-annealed steel sheet with an annealing separator having a low magnesium concentration and containing aluminum oxide (for example, MgO: 10 mass % to 50 mass %, $Al_2O_3$: 50 mass % to 90 mass %) applied to the surface of the decarburization-annealed steel sheet. After that, the annealing separator is removed to obtain a final-annealed steel sheet. As a result, it is possible to form an intermediate layer without substantially forming a final-annealed film made from forsterite ($Mg_2SiO_4$). The MgO content in the annealing separator is preferably 15 mass % or more and more preferably 20 mass % or more. In addition, the MgO content in the annealing separator is preferably 45 mass % or less and more preferably 40 mass % or less.

As the heating conditions in final annealing, ordinary conditions may be adopted, and, for example, the heating rate to the final annealing temperature is set to 5° C./h to 100° C./h, the final annealing temperature (the temperature of a furnace in which final annealing is performed) is set to 1000° C. to 1300° C., and the final annealing time (the holding time at the final annealing temperature) is set to 10 hours to 50 hours.

The oxidation degree ($P_{H2O}/P_{H2}$) of the atmosphere within a predetermined temperature range is controlled to 0.3 to 100000 in the cooling procedure after holding the decarburization-annealed steel sheet at the final annealing temperature of 1000° C. to 1300° C. for 10 hours to 50 hours such that the metallic Fe phases do not easily remain on the surface of the intermediate layer in the intermediate layer forming process described below (the intermediate layer and insulation coating forming process in the manufacturing method according to the second example). When T1 is set to 1100° C. in a case where the final annealing temperature is 1100° C. or higher and T1 is set to the final annealing temperature in a case where the final annealing temperature is lower than 1100° C., the temperature range within which the oxidation degree of the atmosphere is controlled is set to a temperature range of T1 to 500° C.

In the final-annealed steel sheet from which the annealing separator has been removed after the cooling of the decarburization-annealed steel sheet under the above-described conditions, Fe-based oxides are present on the surface, these Fe-based oxides are subjected to the intermediate layer forming process described below (the intermediate layer and insulation coating forming process in the second example) and thereby become an intermediate layer.

When the Fe-based oxides formed on the surface of the final-annealed steel sheet become too thick, there is a case where coarse metallic Fe phases are formed in the interface between the intermediate layer and the insulation coating of the grain-oriented electrical steel sheet that is finally obtained or a case where the Fe-based oxides remain in the interface between the intermediate layer and the base steel sheet. Therefore, the cooling within the temperature range of T1 to 500° C. in the cooling procedure is preferably performed in an atmosphere having an oxidation degree ($P_{H2O}/P_{H2}$) of 0.3 to 100000 and more preferably performed in an atmosphere having an oxidation degree ($P_{H2O}/P_{H2}$) of 0.3 to 1000 such that the thicknesses of the Fe-based oxides can be controlled to preferable thicknesses (10 nm to 100 nm).

The time taken to cool the decarburization-annealed steel sheet under the above-described conditions (time taken to cool the decarburization-annealed steel sheet from T1° C. to 500° C.) is not particularly limited, but is preferably set to 5 hours to 30 hours. The method for removing the annealing separator is also not particularly limited, and examples thereof include rubbing the surface of the final-annealed steel sheet with a brush and the like.

Intermediate Layer Forming Process

In the intermediate layer forming process, thermal oxidation annealing is performed by heating the final-annealed steel sheet to a temperature range of higher than 600° C. and an upper limit temperature or lower and then holding the final-annealed steel sheet within the temperature range in an atmosphere having an oxidation degree ($P_{H2O}/P_{H2}$) of 0.0005 to 0.2 for 10 seconds to 90 seconds. Therefore, an intermediate layer mainly containing silicon oxide is formed on the surface of the final-annealed steel sheet. The upper limit temperature may be set to, for example, 1150° C.

The intermediate layer is preferably formed in a thickness of 2 nm to 400 nm.

In the intermediate layer forming process, thermal oxidation annealing is performed under the above-described conditions, whereby Fe in the Fe-based oxides is reduced, Fe is replaced by Si, and thereby the Fe-based oxides are converted to silicon oxide. Due to this heat treatment, the majority of the Fe-based oxides present on the surface of the final-annealed steel sheet disappear, instead, an intermediate layer mainly containing silicon oxide is formed, and furthermore, some of Fe reduced remains on the surface of the intermediate layer and becomes metallic Fe phases.

After the thermal oxidation annealing, the final-annealed steel sheet is cooled to a temperature range of 600° C. or lower in an atmosphere having an oxidation degree ($P_{H2O}/P_{H2}$) of 0.0005 to 0.2, whereby an intermediate layer mainly containing silicon oxide is continuously formed on the surface of the base steel sheet subsequent to the thermal oxidation annealing.

Figure 5:
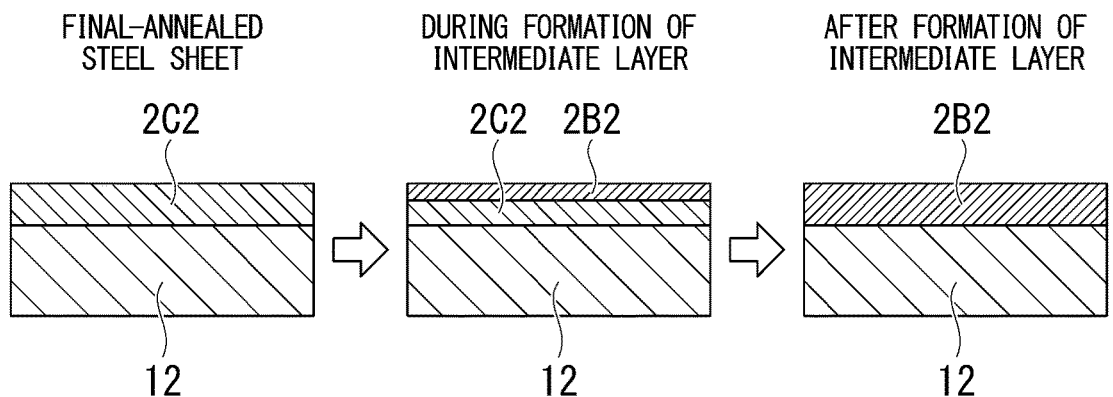
FIG. 5 is a schematic view of a final-annealed steel sheet in a process of forming an intermediate layer in a method for manufacturing the grain-oriented electrical steel sheet according to the second embodiment.

In the method for manufacturing the grain-oriented electrical steel sheet according to the second embodiment, as shown in FIG. 5, a Fe-based oxide layer 2C2 is reduced from the surface side, and the intermediate layer 2B2 is formed such that Fe is replaced by Si. Therefore, it is considered that the intermediate layer 2B2 that is excellent in terms of the adhesion to the base steel sheet 12 is formed and, at the same time, the formation of metallic Fe phases on the surface side of the intermediate layer 2B2 is suppressed. In a case where the Fe-based oxide layer 2C2 is excessively formed, it is considered that the reduction rate of the Fe-based oxide layer 2C2 becomes nonuniform depending on sites and coarse metallic Fe phases are formed.

The conditions of the thermal oxidation annealing in the intermediate layer forming process are not particularly limited, but it is preferable to hold the final-annealed steel sheet, for example, within a temperature range of 700° C. to 1150° C. for 10 seconds to 90 seconds. From the viewpoint of the reaction rate, when the upper limit temperature becomes higher than 1150° C. during the thermal oxidation annealing, the intermediate layer is less likely to be formed uniformly, interfacial unevenness between the intermediate layer and the base steel sheet becomes large, and there are a case where the iron loss of the grain-oriented electrical steel sheet deteriorates and a case where the strength of the grain-oriented electrical steel sheet decreases, treatments in continuous annealing furnaces become difficult, and the productivity degrades.

The holding time during the thermal oxidation annealing is preferably set to 10 seconds or longer from the viewpoint of preferably forming the intermediate layer. From the viewpoint of the productivity and the avoidance of a decrease in the space factor caused by the thickening of the thickness of the intermediate layer, the holding time is preferably set to 60 seconds or shorter.

From the viewpoint of forming the intermediate layer in a thickness of 2 nm to 400 nm, in the thermal oxidation annealing, the final-annealed steel sheet is preferably held within the temperature range of 650° C. to 1000° C. for 15 seconds to 90 seconds and more preferably held with the temperature range of 700° C. to 900° C. for 25 seconds to 60 seconds.

Insulation Coating Forming Process

In the insulation coating forming process, well-known conditions may be applied. For example, a coating solution is applied to the surface of the intermediate layer and then baked within a temperature range of 350° C. to 1150° C. for 5 to 300 seconds in an atmosphere containing hydrogen, water vapor, and nitrogen and having an oxidation degree ($P_{H2O}/P_{H2}$) of 0.001 to 1.0 to form the coating solution to the intermediate layer.

The insulation coating is preferably formed in a thickness of 0.1 μm to 10 μm.

The coating solution is also not particularly limited, and it is possible to distinctively use a coating solution containing colloidal silica and a coating solution containing no colloidal silica. In the case of forming the insulation coating 3 using a coating solution containing colloidal silica, it is possible to form an insulation coating containing Si. In addition, in the case of forming an insulation coating using a coating solution containing no colloidal silica, it is possible to form an insulation coating containing no Si.

Examples of the coating solution containing no colloidal silica include coating solutions containing alumina and boric acid.

In addition, examples of the coating solution containing colloidal silica include coating solutions containing phosphoric acid or a phosphate, colloidal silica, and chromic anhydride or a chromate. Examples of the phosphate include phosphates of Ca, Al, Mg, Sr, and the like. Examples of the chromate include chromates of Na. K, Ca, Sr. and the like. The colloidal silica is not particularly limited, and any appropriate particle size thereof can be used.

A variety of elements or compounds may be further added to the coating solution in order to improve a variety of characteristics as long as the effects of the grain-oriented electrical steel sheet according to the second embodiment are not lost.

In the insulation coating forming process, in a cooling procedure after heating the coating solution within a temperature range of 1150° C. or higher, it is preferable to perform cooling under the following conditions within a temperature range of 600° C. to 1150° C. in order to prevent the insulation coating and the intermediate layer from changing (decomposing or the like) after baking.

Oxidation degree ($P_{H2O}/P_{H2}$) of atmosphere: 0.01 to 0.1
Dwell time: 10 seconds to 30 seconds The gas in the atmosphere may be a gas that is ordinarily used, and it is possible to use, for example, a gas containing 25% by volume of hydrogen with a remainder made up of nitrogen and an impurity.

In the cooling procedure of the insulation coating forming process, when the oxidation degree ($P_{H2O}/P_{H2}$) within the temperature range of 600° C. to 1150° C. is less than 0.01, there is a case where the insulation coating is decomposed. In addition, when the oxidation degree ($P_{H2O}/P_{H2}$) of the atmosphere within the above-described temperature range exceeds 0.1, there is a case where the base steel sheet is significantly oxidized and the iron loss of the grain-oriented electrical steel sheet deteriorates. The oxidation degree ($P_{H2O}/P_{H2}$) of the atmosphere within the above-described temperature range is preferably 0.02 to 0.05 and more preferably 0.03 to 0.08.

The temperature at which the cooling is controlled is preferably 650° C. to 1050° C. and more preferably 650° C. to 950° C.

When the dwell time within the temperature range of 600° C. to 1150° C. is shorter than 10 seconds, there is a case where the steel sheet shape becomes poor due to cooling unevenness. When the dwell time within the above-described temperature range exceeds 30 seconds, there is a case where the steel sheet is oxidized and the iron loss of the grain-oriented electrical steel sheet deteriorates. The dwell time within the above-described temperature range is preferably 10 seconds to 25 seconds and more preferably seconds to 20 seconds.

Other Processes

The method for manufacturing the grain-oriented electrical steel sheet according to the first example may further have a process that is ordinarily performed in methods for manufacturing grain-oriented electrical steel sheets. The manufacturing method may further have a nitriding treatment process of performing a nitriding treatment that increases the N content of the decarburization-annealed steel sheet between the beginning of the decarburization annealing and the initiation of secondary recrystallization in the final annealing. This is because it is possible to stably improve the magnetic flux density by increasing an inhibitor such as AlN through nitriding. The nitriding treatment may be an ordinary nitriding treatment, and examples thereof include a treatment of annealing the decarburization-annealed steel sheet in an atmosphere containing a gas having a nitriding capability such as ammonia, a treatment of final-annealing the decarburization-annealed steel sheet to which an annealing separator containing powder having a nitriding capability such as MnN is applied, and the like.

Manufacturing Method According to Second Example

As the method for manufacturing the grain-oriented electrical steel sheet according to the second embodiment, in the manufacturing method according to the second example, the process of forming the intermediate layer and the process of forming the insulation coating in the manufacturing method according to the first example are performed in one process. The manufacturing method according to the second example is not different from the manufacturing method according to the first example except that the intermediate layer and the insulation coating are formed in one process. Therefore, hereinafter, only an intermediate layer and insulation coating forming process in which the intermediate layer and the insulation coating are formed in one process will be described.

Intermediate layer and insulation coating forming process

A coating solution is applied to the surface of the final-annealed steel sheet obtained by the final annealing process, and the final-annealed steel sheet is annealed, for example, within a temperature range of higher than 600° C. and 1150° C. or lower in an atmosphere having an oxidation degree ($P_{H2O}/P_{H2}$) of 0.01 to 0.3, thereby forming an intermediate layer mainly containing silicon oxide and an insulation coating on the surface of the final-annealed steel sheet at the same time.

As the coating solution and the gas in the atmosphere, the same coating solution and gas as in the manufacturing method of the first embodiment may be used.

The coating solution is applied to the surface of the final-annealed steel sheet and the final-annealed steel sheet is annealed as described above, whereby Fe in the Fe-based oxides is reduced, an intermediate layer and metallic Fe phases are formed on the surface of the final-annealed steel sheet and, at the same time, the coating solution is baked to form an insulation coating on the surface of the intermediate layer.

In order to progress the formation of the intermediate layer by thermal oxidation and the formation of the insulation coating by the baking of the coating solution at the same time, the oxidation degree ($P_{H2O}/P_{H2}$) of the atmosphere is preferably set to 0.05 to 0.25 and more preferably set to 0.1 to 0.2.

The present invention is not limited to the above-described embodiments. The above-described embodiments are exemplary examples, and any grain-oriented electrical steel sheets and methods for manufacturing the same are included in the technical scope of the present invention as long as the grain-oriented electrical steel sheets and the manufacturing methods have substantially the same configuration and exhibit the same action and effect as the technical concept described in the claims of the present invention.

EXAMPLES

Hereinafter, the present invention will be specifically described by exemplifying examples and comparative examples. In the following description, conditions in the examples are exemplary conditions adopted to confirm the feasibility and effects of the present invention, and the present invention is not limited to these exemplary conditions. The present invention is capable of adopting a variety of conditions within the scope of the gist of the present invention as long as the object of the present invention is achieved.

In addition, evaluation methods in the examples and the comparative examples may be ordinary methods and do not need to be special methods. However, in the examples of the grain-oriented electrical steel sheet according to the first embodiment and the examples of the grain-oriented electrical steel sheet according to the second embodiment, for example, the following evaluation methods are used.

[Coating Structures]

The coating structures of the grain-oriented electrical steel sheets were evaluated by observing a cross section of coatings with a scanning transmission electron microscope (STEM) in which the diameter of an electron beam was set to 10 nm and measuring the thickness of an intermediate layer.

Specifically, regarding the thickness of the intermediate layer, a specimen for STEM observation was cut out so as to have an observation cross section parallel to the sheet thickness direction and perpendicular to the rolling direction, and a line analysis was performed on the observation cross section at 100 sites at intervals of 0.1 μm in a direction parallel to the surface of a base steel sheet. At this time, quantitative analyses were performed on five elements of Fe, P, Si, O, and Mg at intervals of 1 nm in the sheet thickness direction by energy-dispersive X-ray spectroscopy (EDS) in which the diameter of an electron beam was set to 10 nm to specify the kind of each layer and measure the thickness of each layer. A specific method for specifying the kind of each layer was as described below. In addition, the average value T of the thickness of the intermediate layer and the standard deviation σ of the thickness of the intermediate layer were calculated by the above-described method. The obtained standard deviation σ of the thickness of the intermediate layer was divided by the average value T of the thickness of the intermediate layer, thereby obtaining the coefficient of variation (σ/T) of the thickness of the intermediate layer.

[Chemical Composition]

The chemical composition of the base steel sheet was measured using spark optical emission spectrometry (Spark-OES). In addition, in the case of a small content, the content was measured using inductively coupled plasma-atomic emission spectrometry (ICP-AES). Acid-soluble Al was measured by ICP-MS using a filtrate obtained by hydrolyzing a specimen with an acid. In addition, C and S were measured using an infrared absorption method after combustion, and N was measured using an inert gas fusion thermal conductivity method.

[Adhesion]

The adhesion of an insulation coating was evaluated by performing an adhesion test according to the bend resistance test of JIS K 5600-5-1 (1999). A test piece that was 80 mm long in the rolling direction and 40 mm long in a direction perpendicular to the rolling direction was collected from the grain-oriented electrical steel sheet. The collected test piece was coiled around a round bar having a diameter of 16 mm. In the adhesion test, the test piece was bent 180° using a type 1 testing device described in the bend resistance test of JIS K 5600-5-1 (1999). From the bent test piece, the area percentage of a portion from which the insulation coating peeled off was measured. In a case where the peel percentage of the insulation coating was 30% or less, the adhesion of the insulation coating was regarded as excellent and determined as pass. In a case where the peel percentage of the insulation coating was more than 30%, the adhesion of the insulation coating was regarded as poor and determined as fail.

[Iron Losses]

Regarding iron losses, the iron loss W17/50 (W/kg) at an excited magnetic flux density of 1.7 T and a frequency of 50 Hz was measured by the Epstein test based on JIS C 2550-1. In a case where the iron loss W17/50 was 1.00 or less, the iron loss was determined as favorable. On the other hand, in a case where the iron loss W17/50 was more than 1.00, the iron loss was determined as poor.

<Examples of Grain-Oriented Electrical Steel Sheet According to First Embodiment>

Example 1

A slab having the chemical composition of A steel in Table 1 (remainder: Fe and an impurity) was soaked at 1150° C. for 60 minutes, and then hot rolling was performed on the heated slab, thereby obtaining a hot-rolled steel sheet having a sheet thickness of 2.8 mm. Next, hot band annealing was performed by holding the hot-rolled steel sheet at 900° C. for 120 seconds and then quenching the hot-rolled steel sheet, thereby obtaining an annealed steel sheet. Next, the annealed steel sheet was pickled, and cold rolling was performed on the pickled annealed steel sheet, thereby obtaining a cold-rolled steel sheet having a final sheet thickness of 0.23 mm. The units of numerical values in Table 1 are all "mass %".

TABLE 1

| Steel type/elements | C | Mn | S | Se | Si | Al | Cu | P | N | Fe |
|---|---|---|---|---|---|---|---|---|---|---|
| Steel A | 0.053 | 0.11 | 0.004 | 0.001 | 3.30 | 0.030 | 0.05 | 0.010 | 0.0080 | Remainder |
| Steel B | 0.062 | 0.09 | 0.004 | 0.001 | 3.40 | 0:028 | 0.15 | 0.013 | 0.0078 | Remainder |
| Steel C | 0.048 | 0.20 | 0.005 | 0.004 | 3.01 | 0.024 | 0.01 | 0.090 | 0.0081 | Remainder |
| Steel D | 0.067 | 0.15 | 0.007 | 0.005 | 3.47 | 0.024 | 0.19 | 0.011 | 0.0087 | Remainder |

Decarburization annealing was performed by holding the obtained cold-rolled steel sheet at 850° C. for 90 seconds in an atmosphere containing 75% by volume of hydrogen with a remainder made up of nitrogen and an impurity, thereby obtaining a decarburization-annealed steel sheet.

An annealing separator having a composition of 60 mass % of alumina and 40 mass % of magnesia was applied to the obtained decarburization-annealed steel sheet. Next, the decarburization-annealed steel sheet was heated up to 1200° C. at a temperature rise rate of 15° C./h in a hydrogen-nitrogen mixed atmosphere, and then final annealing was performed by holding the decarburization-annealed steel sheet at 1200° C. for 20 hours in a hydrogen atmosphere.

After that, the decarburization-annealed steel sheet was cooled from 1100° C. to 500° C. in an atmosphere having an oxidation degree ($P_{H2O}/P_{H2}$) of 90000 for 10 hours.

After the cooling, the annealing separator was removed from the surface using a brush, thereby obtaining a final-annealed steel sheet in which secondary recrystallization was completed.

The obtained final-annealed steel sheet was heated within a temperature range of 300° C. to 750° C. at an average heating rate of 100° C./second in an atmosphere having an oxidation degree ($P_{H2O}/P_{H2}$) of 0.001. Next, the final-annealed steel sheet was held within a temperature range of 750° C. to 1150° C. for 60 seconds in an atmosphere having an oxidation degree ($P_{H2O}/P_{H2}$) of 0.005, thereby forming an intermediate layer.

A coating solution containing a phosphate and colloidal silica was applied to the surface of the steel sheet on which the intermediate layer had been formed, heated up to 800° C. in an atmosphere containing hydrogen, water vapor, and nitrogen and having an oxidation degree ($P_{H2O}/P_{H2}$) of 0.1, and then held for 60 seconds, thereby baking an insulation coating.

A grain-oriented electrical steel sheet of Example 1 was obtained by the above-described method.

In the grain-oriented electrical steel sheet of Example 1 obtained as described above, no unevenness was formed in the interface between the intermediate layer and the base steel sheet. Specifically, Ra of the surface of the final-annealed steel sheet was 0.3 µm. The surface roughness Ra of the final-annealed steel sheet was measured by the same measuring method as the above-described method for measuring the surface roughness Ra of the base steel sheet. Since the surface roughness Ra does not change even when the intermediate layer and the insulation coating are formed on the surface of the final-annealed steel sheet, it is possible to regard the surface roughness Ra of the final-annealed steel sheet as the surface roughness Ra of the base steel sheet of the grain-oriented electrical steel sheet.

Table 2 shows the manufacturing conditions, the standard deviations σ of the thicknesses of the intermediate layers, the average values T of the thicknesses of the intermediate layers, the coefficients of variation (σ/T) of the thicknesses of the intermediate layers, the surface roughness Ra of the final-annealed steel sheets, and the measurement results of the peel percentages (%) of the insulation coatings after the 416 mm bend test and the iron losses W17/50 (W/kg).

TABLE 2

| Steel type | Example | Oxidation degree of atmosphere in cooling procedure of final annealing process | Oxidation degree of atmosphere in heating procedure of intermediate layer forming process | Heating rate in atmosphere in heating procedure of intermediate layer forming process | Oxidation degree of atmosphere during holding in intermediate layer forming process | Holding temperature in intermediate layer forming process | Average value T of thickness of intermediate layer (nm) | Standard deviation σ of thickness of intermediate layer (nm) | σ/T | Peel percentage of insulation coating after φ16 mm bend test (%) | Ra of final-annealed steel sheet surface (µm) | Iron loss (W/kg) |
|---|---|---|---|---|---|---|---|---|---|---|---|---|
| Steel A | Comparative Example 1 | 150000 | 0.01 | 250° C./sec | 0.01 | 830° C. | 50.6 | 29.3 | 0.579 | 69 | 0.20 | 0.91 |
| | Comparative Example 2 | 150000 | 0.001 | 150° C./sec | 0.001 | 870° C. | 97.2 | 54.5 | 0.561 | 72 | 0.28 | 0.92 |
| | Comparative Example 3 | 110000 | 0.1 | 50° C./sec | 0.1 | 800° C. | 41.2 | 24.1 | 0.585 | 71 | 0.26 | 0.84 |
| | Example 1 | 90000 | 0.001 | 100° C./sec | 0.005 | 870° C. | 100.7 | 46.1 | 0.458 | 27 | 0.30 | 0.88 |
| | Example 2 | 1000 | 0.005 | 200° C./sec | 0.001 | 870° C. | 52.1 | 15.6 | 0.299 | 16 | 0.25 | 0.82 |
| | Example 3 | 100 | 0.01 | 20° C./sec | 0.01 | 850° C. | 35.1 | 4.6 | 0.131 | 5 | 0.21 | 0.91 |
| | Example 4 | 10 | 0.01 | 50° C./sec | 0.01 | 830° C. | 28.3 | 7.5 | 0.265 | 11 | 0.19 | 0.89 |
| | Example 5 | 1 | 0.1 | 150° C./sec | 0.1 | 800° C. | 15.9 | 6.2 | 0.390 | 22 | 0.23 | 0.81 |
| | Example 6 | 0.3 | 0.05 | 70° C./sec | 0.05 | 800° C. | 18.1 | 8.2 | 0.453 | 25 | 0.26 | 0.90 |
| | Comparative Example 4 | 0.05 | 0.01 | 50° C./sec | 0.01 | 830° C. | 30.2 | 21.1 | 0.699 | 78 | 0.24 | 0.91 |
| | Comparative Example 5 | 0.01 | 0.00001 | 50° C./sec | 0.1 | 800° C. | 10.1 | 5.5 | 0.545 | 51 | 0.22 | 0.88 |
| | Comparative Example 6 | 0.0005 | 0.1 | 100° C./sec | 0.001 | 870° C. | 49.2 | 30.1 | 0.612 | 74 | 0.21 | 0.85 |
| | Comparative Example 7 | 0.0005 | 0.2 | 70° C./sec | 0.005 | 870° C. | 96.5 | 71.2 | 0.800 | 80 | 0.31 | 0.83 |
| | Comparative Example 8 | 1 | 0.2 | 50° C./sec | 0.05 | 850° C. | 30.2 | 20.1 | 0.666 | 61 | 0.20 | 0.89 |
| | Comparative Example 9 | 1 | 0.05 | 10° C./sec | 0.05 | 850° C. | 32.2 | 23.1 | 0.717 | 57 | 0.19 | 0.91 |
| | Comparative Example 10 | 1 | 0.05 | 250° C./sec | 0.05 | 850° C. | 20.1 | 12.1 | 0.602 | 51 | 0.21 | 0.91 |
| | Comparative Example 11 | 1 | 0.00001 | 50° C./sec | 0.1 | 850° C. | 23.1 | 14.1 | 0.610 | 59 | 0.22 | 0.92 |

Example 2 to Example 6

Grain-oriented electrical steel sheets of Examples 2 to 6 were obtained under the same manufacturing conditions as in Example 1 except that the oxidation degree of the atmosphere in the cooling procedure of the final annealing process, the oxidation degree of the atmosphere and the temperature rise rate in the heating procedure of the intermediate layer forming process, and the holding temperature and the oxidation degree in the intermediate layer forming process were changed to the conditions shown in Table 2.

Comparative Examples 1 to 11

Grain-oriented electrical steel sheets of Comparative Example 1 to Comparative Example 11 were manufactured under the manufacturing conditions shown in Table 2. Conditions other than the conditions shown in Table 2 were the same as in Example 1.

Next, grain-oriented electrical steel sheets of Examples 7 to 10 and Comparative Examples 8 to 15 were manufactured using A steel, B steel, C steel, and D steel shown in Table 1 under the manufacturing conditions shown in Table 3. Conditions other than the conditions shown in Table 2 were the same as in Example 1.

coefficient of variation ($\sigma/T$) of the thickness of the intermediate layer exceeded 0.500, the peel percentages of the insulation coating were as high as 51% or more, and the adhesion of the insulation coatings was not sufficient.

As shown in Table 2, in the grain-oriented electrical steel sheets of Comparative Examples 4 to 7, the oxidation degrees ($P_{H2O}/P_{H2}$) of the atmospheres in the cooling procedure of the final annealing process were as low as 0.1 or less. Therefore, it is considered that the thickness of the intermediate layer became nonuniform, and, in a case where the grain-oriented electrical steel sheet was bent, stress concentrated in a part, and the insulation coating became easily peelable.

In addition, as shown in Table 2, in the grain-oriented electrical steel sheets of Comparative Examples 1 to 3, the oxidation degrees ($P_{H2O}/P_{H2}$) of the atmospheres in the cooling procedure of the final annealing process were as high as 110000 or more. Therefore, it is considered that the thickness of the intermediate layer became nonuniform, and, in a case where the grain-oriented electrical steel sheet was bent, stress concentrated in a part, and the insulation coating became easily peelable.

As shown in Table 2, in the grain-oriented electrical steel sheets of Comparative Example 8 and Comparative

TABLE 3

| Steel type | Example | Oxidation degree of atmosphere in cooling procedure of final annealing process | Oxidation degree of atmosphere in heating procedure of intermediate layer forming process | Heating rate in atmosphere in heating procedure of intermediate layer forming process | Oxidation degree of atmosphere during holding in intermediate layer forming process | Holding temperature in intermediate layer forming process | Average value T of thickness of intermediate layer (nm) | Standard deviation σ of thickness of intermediate layer (nm) | σ/T | Peel percentage of insulation coating after φ16 mm bend test (%) | Ra of final annealed steel sheet surface (μm) | Iron loss (W/kg) |
|---|---|---|---|---|---|---|---|---|---|---|---|---|
| Steel A | Comparative Example 8 | <u>0.01</u> | 0.05 | 50° C./sec | 0.05 | 850° C. | 34.2 | 18.3 | <u>0.535</u> | <u>34</u> | 0.20 | 0.88 |
| | Comparative Example 9 | <u>200000</u> | 0.05 | 50° C./sec | 0.05 | 850° C. | 88.3 | 53.2 | <u>0.602</u> | <u>64</u> | 0.28 | 0.91 |
| | Example 7 | 100 | 0.05 | 50° C./sec | 0.05 | 850° C. | 37.2 | 7.1 | 0.191 | 4 | 0.26 | 0.87 |
| Steel B | Comparative Example 10 | <u>0.01</u> | 0.05 | 50° C./sec | 0.05 | 850° C. | 43.2 | 28.1 | <u>0.650</u> | <u>78</u> | 0.30 | 0.91 |
| | Comparative Example 11 | <u>200000</u> | 0.05 | 50° C./sec | 0.05 | 850° C. | 98.1 | 56.3 | <u>0.574</u> | 55 | 0.25 | 0.85 |
| | Example 8 | 100 | 0.05 | 50° C./sec | 0.05 | 850° C. | 44.4 | 9.8 | 0.221 | 14 | 0.21 | 0.87 |
| Steel C | Comparative Example 12 | <u>0.01</u> | 0.05 | 50° C./sec | 0.05 | 850° C. | 21.3 | 13.9 | <u>0.653</u> | <u>89</u> | 0.19 | 0.91 |
| | Comparative Example 13 | <u>200000</u> | 0.05 | 50° C./sec | 0.05 | 850° C. | 40.2 | 27.5 | <u>0.684</u> | <u>79</u> | 0.23 | 0.90 |
| | Example 9 | 100 | 0.05 | 50° C./sec | 0.05 | 850° C. | 23.1 | 6.5 | 0.281 | 21 | 0.26 | 0.89 |
| Steel D | Comparative Example 14 | <u>0.01</u> | 0.05 | 50° C./sec | 0.05 | 850° C. | 42.1 | 30.1 | <u>0.715</u> | <u>95</u> | 0.24 | 0.88 |
| | Comparative Example 15 | <u>200000</u> | 0.05 | 50° C./sec | 0.05 | 850° C. | 86.4 | 60.1 | <u>0.696</u> | <u>77</u> | 0.22 | 0.86 |
| | Example 10 | 100 | 0.05 | 50° C./sec | 0.05 | 850° C. | 49.8 | 19.1 | 0.384 | 25 | 0.21 | 0.84 |

(Evaluation Results)

The evaluation results are shown in Table 2 and Table 3. In Table 2 and Table 3, manufacturing conditions and characteristics that am not preferable are underlined.

The base steel sheet of Examples 1 to 10 contained, by mass %, Si: 3.00% to 3.50%, C: 0.005% or less, acid-soluble Al: 0.005% or less, N: 0.0040% or less, Mn: 0.05% to 0.25%, and S and Se: 0.005% or less in total with a remainder made up of Fe and an impurity.

As shown in Table 2, in the grain-oriented electrical steel sheets of Comparative Examples 1 to 7 in which the intermediate layer mainly containing silicon oxide was present on the surface of the base steel sheet, the insulation coating was present on the surface of the intermediate layer, but the Example 9, the reactions progressed excessively in the heating procedure of the intermediate layer forming process, and the thicknesses of the intermediate layers became nonuniform. Therefore, it is considered that, in a case where the grain-oriented electrical steel sheet was bent, stress concentrated in a part, and the insulation coating became easily peelable.

As shown in Table 2, in the grain-oriented electrical steel sheet of Comparative Example 10, the heating rate was fast in the heating procedure of the intermediate layer forming process, and the temperature reached a temperature range in which the reaction rate was fast even before the reaction progressed sufficiently. Therefore, it is considered that the thickness of the intermediate layer became nonuniform, and, in a case where the grain-oriented electrical steel sheet was bent, stress concentrated in a part, and the insulation coating became easily peelable.

As shown in Table 2, in the grain-oriented electrical steel sheet of Comparative Example 11, the oxidation degree of the atmosphere in the heating procedure of the intermediate layer forming process was 0.00001, which is too low. Therefore, in the heating procedure of the intermediate layer forming process, the temperature reached a temperature range in which the reaction rate was fast even before the reaction progressed sufficiently. As a result, it is considered that the thickness of the intermediate layer became nonuniform, and, in a case where the grain-oriented electrical steel sheet was bent, stress concentrated in a part, and the insulation coating became easily peelable.

In contrast, in the grain-oriented electrical steel sheets of Examples 1 to 6 in which the intermediate layer mainly containing silicon oxide was present on the surface of the base steel sheet, the insulation coating was present on the surface of the intermediate layer, and the coefficient of variation ($\sigma/T$) of the thickness of the intermediate layer was 0.500 or less, the coating peel percentages reached 27% or less, and the adhesion of the insulation coatings was extremely favorable.

In the grain-oriented electrical steel sheets of Examples 1 to 6, the oxidation degrees ($P_{H2O}/P_{H2}$) of the atmospheres in the cooling procedure of the final annealing process were 03 to 100000. Therefore, it is considered that the thickness of the intermediate layer became uniform, and, in a case where the grain-oriented electrical steel sheet was bent, the concentration of stress in a part was suppressed, and the insulation coating did not easily peel off.

When Examples 1 to 4 were compared with each other, the coefficient of variation ($\sigma/T$) of the thickness of the intermediate layer and the peel percentage of the insulation coating were lowest in Example 3. There is a tendency that, as the oxidation degree of the atmosphere in the cooling procedure of the final annealing process increases or decreases, the coefficient of variation ($\sigma/T$) of the thickness of the intermediate layer and the peel percentage of the insulation coating increase from the values in Example 3 as the lowest values. Since the peel percentage of the insulation coating decreases as the coefficient of variation ($\sigma/T$) of the thickness of the intermediate layer decreases, it is considered that the coefficient of variation ($\sigma/T$) of the thickness of the intermediate layer is preferably 0.400 or less and more preferably 0.350 or less.

From the results shown in Table 2, it was found that, in the grain-oriented electrical steel sheets of Examples 1 to 6, it was possible to suppress the surface roughness Ra of the final-annealed steel sheets to 0.30 μm or less and the iron losses were also suppressed to a low range.

Furthermore, it was found that, in order to suppress the surface roughness Ra of the final-annealed steel sheet at a lower level and obtain a lower iron loss, it is preferable to set the oxidation degree of the atmosphere in the cooling procedure of the final annealing process to 0.3 to 1000 and to set the oxidation degree ($P_{H2O}/P_{H2}$) in the intermediate layer forming process to 0.001 to 0.1.

From the above-described results, it was clarified that, in a grain-oriented electrical steel sheet which has a base steel sheet in which a final-annealed film is substantially not present on the surface, an intermediate layer that is disposed on the surface of the base steel sheet and mainly contains silicon oxide, and an insulation coating disposed on the surface of the intermediate layer and in which, in the intermediate layer, the value obtained by dividing the standard deviation $\sigma$ of the thickness of the intermediate layer by the average value T of the thickness of the intermediate layer is 0.500 or less, the iron loss is low and the adhesion of the insulation coating is excellent.

From Table 3, it is found that, even from the A steel, the B steel, the C steel, and the D steel having different chemical compositions, grain-oriented electrical steel sheets in which the coefficient of variation ($\sigma/T$) of the thickness of the intermediate layer is 0.500 or less can be obtained by setting the oxidation degree ($P_{H2O}/P_{H2}$) in the cooling procedure of the final annealing process to an appropriate range and setting the manufacturing conditions of the intermediate layer forming process to appropriate conditions.

As shown in Table 3, it is found that, when the average thickness T of the intermediate layer is 20.0 μm to 50.0 μm and the surface roughness Ra of the final-annealed steel sheet is 0.20 μm to 0.30 μm, it is possible to obtain grain-oriented electrical steel sheets in which the iron loss is small, the coefficient of variation ($\sigma/T$) of the thickness of the intermediate layer is lower, and the peel percentage of the insulation coating after the ϕ16 mm bend test is low.

In addition, from the results shown in Table 2 and Table 3, it is found that, in order to further decrease the peel percentage of the insulation coating, the surface roughness Ra of the final-annealed steel sheet, and the iron loss, the coefficient of variation ($\sigma/T$) of the thickness of the intermediate layer is preferably 0.400 or less, more preferably set to 0.350 or less, and still more preferably set to 0.300 or less.

<Examples of Grain-Oriented Electrical Steel Sheet According to Second Embodiment>

In the examples of the grain-oriented electrical steel sheet according to the second embodiment, in addition to (or in place of) the items evaluated in the examples of the grain-oriented electrical steel sheet according to the first embodiment, the following items were evaluated.

[Adhesion]

The adhesion of an insulation coating was evaluated by performing an adhesion test according to the bend resistance test of JIS K 5600-5-1 (1999). A test piece that was 80 mm long in the rolling direction and 40 mm long in a direction perpendicular to the rolling direction was collected from the grain-oriented electrical steel sheet. The collected test piece was coiled around a round bar having a diameter of 16 mm. In the adhesion test, the test piece was bent 180° using a type I testing device described in the bend resistance test of JIS K 5600-5-1 (1999). From the bent test piece, the area percentage of a portion in which the insulation coating did not peel off but remained was measured. In a case where the residual percentage of the insulation coating was 50% or more, the adhesion of the insulation coating was regarded as excellent and determined as pass. In a case where the residual percentage of the insulation coating was less than 50%, the adhesion of the insulation coating was regarded as poor and determined as fail.

[Measurement of Lengths of Metallic Fe Phases]

The lengths of metallic Fe phases were measured by observation with a scanning electron microscope (SEM). On a cross section perpendicular to the rolling direction, the lengths of a region that was 1000 μm or longer in the sheet width direction and 10 or more metallic Fe phases were measured with a SEM. The metallic Fe phases can be determined using a reflected electron image that is obtained by observing a cross section of the grain-oriented electrical steel sheet perpendicular to the rolling direction with a SEM. The reflected electron image was converted to a monochromatic image with 256 levels of grayscale, and regions having ±20% grayscale levels of the average grayscale level of the base steel sheet were determined as metallic Fe. Among the regions determined as metallic Fe, regions that were not continuous with the base steel sheet were defined as the metallic Fe phases. This is because the measurement target is the metallic Fe phases present in the interface between the intermediate layer and the insulation coating. The monochromatic image was converted to a binarized image using a 30% grayscale level from the white side as a threshold value, and a white region was defined as the base steel sheet.

The total of the obtained lengths of the metallic Fe phases was calculated, thereby obtaining the total of the lengths of the metallic Fe phases present in the interface between the intermediate layer and the insulation coating. The obtained total of the lengths of the metallic Fe phases was divided by the length of the observation region in the sheet width direction, thereby obtaining the percentage of the total of the lengths of the metallic Fe phases with respect to the length of the interface between the intermediate layer and the insulation coating in the cross section perpendicular to the rolling direction. The length of the metallic Fe phase was defined as the maximum length in a direction parallel to the interface between the base steel sheet and the intermediate layer.

In addition, the frequencies of the metallic Fe phases were obtained every 25 mm in length, and a graph (cumulative frequency distribution) showing the relationship among the lengths, frequencies, and cumulative relative frequencies of the metallic Fe phases present in the interface between the intermediate layer and the insulation coating was obtained. Therefore, the length of the metallic Fe phase when the cumulative relative frequency was 0.95 was obtained.

[Measurement of Thicknesses of Fe-Based Oxides]

Fe-based oxides having a thickness of more than 2 nm were identified using electron beam diffraction with a TEM. In a cross section of the grain-oriented electrical steel sheet perpendicular to the rolling direction, the diameter of the electron beam was set to 10 nm, an electron beam diffraction image oriented in a direction perpendicular to the surface of the grain-oriented electrical steel sheet from the inside of the base steel sheet was acquired, and the presence or absence of the Fe-based oxides having a thickness of more than 2 nm was confirmed. In a case where the Fe-based oxides were present in the interface between the base steel sheet and the intermediate layer, regions in which an electron beam diffraction image of the Fe-based oxide was obtained were continuously present in a region in which an electron beam diffraction image of the base steel sheet was obtained. In a case where the Fe-based oxides were not present in the interface, a region in which an electron beam diffraction pattern unique to amorphous substances, from which no clear dot-like electron beam diffraction pattern can be obtained and which is ordinarily called a halo pattern was obtained appeared in a region in which an electron beam diffraction image of the base steel sheet was obtained. The distance from a point at which the electron beam diffraction image of the Fe-based oxide appeared to a point at which the electron beam diffraction pattern disappeared (the length in a direction perpendicular to the surface of the base steel sheet (the interface between the base steel sheet and the intermediate layer)) was defined as the thickness of the Fe-based oxide. $Fe_2O_3$, $Fe_3O_4$, FeO, and $Fe_2SiO_4$ were determined as the Fe-based oxides. The presence or absence of Fe-based oxides having a thickness of more than 2 nm was confirmed by the above-described method at 30 sites, and the number of the Fe-based oxides having a thickness of more than 2 nm was measured.

Example 1

Slabs having a chemical composition of one of steel types A to I shown in Table 4 (remainder: Fe and an impurity) were soaked at 1150° C. for 60 minutes, and then hot rolling was performed on the heated slabs, thereby obtaining hot-rolled steel sheets having a sheet thickness of 2.8 mm. Next, hot band annealing was performed by holding the hot-rolled steel sheets at 900° C. for 120 seconds and then quenching the hot-rolled steel sheets, thereby obtaining annealed steel sheets. Next, the annealed steel sheets were pickled, and cold rolling was performed on the pickled annealed steel sheets, thereby obtaining a plurality of cold-rolled steel sheets having a final sheet thickness of 0.23 mm. The units of numerical values in Table 4 are all "mass %".

TABLE 4

| Steel type | C | Mn | S | Se | Si | Al | Cu | P | N | Sn | Sb | Sn + Sb | Fe | Note |
|---|---|---|---|---|---|---|---|---|---|---|---|---|---|---|
| A | 0.053 | 0.11 | 0.004 | 0.001 | 3.30 | 0.030 | 0.05 | 0.010 | 0.0070 | <0.005 | <0.005 | <0.005 | Remainder | Comparative Example |
| B | 0.062 | 0.09 | 0.004 | 0.001 | 3.40 | 0.028 | 0.15 | 0.013 | 0.0091 | 0.04 | <0.005 | 0.04 | Remainder | Example |
| C | 0.048 | 0.19 | 0.005 | 0.004 | 3.15 | 0.024 | 0.05 | 0.009 | 0.0081 | 0.01 | <0.005 | 0.01 | Remainder | Example |
| D | 0.067 | 0.17 | 0.007 | 0.005 | 3.44 | 0.024 | 0.15 | 0.011 | 0.0087 | 0.05 | 0.06 | 0.11 | Remainder | Example |
| E | 0.053 | 0.11 | 0.004 | 0.001 | 3.33 | 0.031 | 0.01 | 0.010 | 0.0080 | <0.005 | 0.02 | 0.02 | Remainder | Example |
| F | 0.062 | 0.09 | 0.005 | 0.004 | 3.40 | 0.028 | 0.05 | 0.013 | 0.0078 | 0.8 | <0.005 | 0.8 | Remainder | Example |
| G | 0.050 | 0.11 | 0.005 | 0.005 | 3.03 | 0.026 | 0.15 | 0.090 | 0.0081 | <0.005 | 0.09 | 0.09 | Remainder | Example |
| H | 0.061 | 0.15 | 0.007 | 0.001 | 3.47 | 0.024 | 0.19 | 0.012 | 0.0087 | 1.1 | <0.005 | 1.1 | Remainder | Comparative Example |
| I | 0.059 | 0.12 | 0.007 | 0.005 | 3.61 | 0.027 | 0.19 | 0.017 | 0.0087 | <0.005 | 1.2 | 1.2 | Remainder | Comparative Example |

Decarburization annealing was performed by holding the obtained cold-rolled steel sheets at 850° C. for 90 seconds in an atmosphere containing 75% by volume of hydrogen with a remainder made up of nitrogen and an inevitable impurity, thereby obtaining decarburization-annealed steel sheets.

An annealing separator having a composition of 60 mass % of alumina and 40 mass % of magnesia was applied to a decarburization-annealed steel sheet obtained using the slab of the steel type B. Next, the decarburization-annealed steel sheet was heated up to 1200° C. at a temperature rise rate of 15° C./hour in a hydrogen-nitrogen mixed atmosphere, and then final annealing was performed by holding the decarburization-annealed steel sheet at 1200° C. for 20 hours in a hydrogen atmosphere.

After that, the decarburization-annealed steel sheet was cooled from 110'C to 500° C. in an atmosphere having an oxidation degree ($P_{H2O}/P_{H2}$) shown in Table 5 for 10 hours. After the cooling, the annealing separator was removed from the surface using a brush, thereby obtaining a final-annealed steel sheet in which secondary recrystallization was completed.

Thermal oxidation annealing was performed by holding the obtained final-annealed steel sheet at 800° C. in an atmosphere having an oxidation degree ($P_{H2O}/P_{H2}$) of 0.1 for 60 seconds, and then the final-annealed steel sheet was cooled to a temperature range of 600° C. or lower in an atmosphere having an oxidation degree ($P_{H2O}/P_{H2}$) of 0.1, thereby forming an intermediate layer. Next, a coating solution containing a phosphate, colloidal silica, and a chromate was applied to the surface of the final-annealed steel sheet on which the intermediate layer was formed, heated up to 800° C. in an atmosphere containing hydrogen, water vapor, and nitrogen and having an oxidation degree ($P_{H2O}/P_{H2}$) of 0.1, and then held for 60 seconds, thereby baking an insulation coating.

A grain-oriented electrical steel sheet of Example 1 was obtained by the above-described method.

shown in Table 5 at a temperature shown in Table 5, thereby forming an intermediate layer and an insulation coating on the surface of the final-annealed steel sheet at the same time. For examples manufactured by the manufacturing method according to the second example, "oxidation degree of atmosphere during holding in intermediate layer forming process" and "holding temperature in intermediate layer forming process" in the tables indicate "oxidation degree of atmosphere during holding in intermediate layer and insulation coating forming process" and "holding temperature in intermediate layer and insulation coating forming process", respectively.

Examples 8 to 10 and Comparative Examples 10 to 22

Grain-oriented electrical steel sheets of Examples 8 to 10 and Comparative Examples 10 to 22 were obtained under the manufacturing conditions shown in Table 6. Conditions

TABLE 5

| Example | Steel type | Sn + Sb | Oxidation degree of atmosphere in cooling procedure of final annealing process | Oxidation degree of atmosphere in heating procedure of intermediate layer forming process | Holding temperature in intermediate layer forming process | Linear fraction of metallic Fe phases (%) | Fe-based oxides in interface between base steel sheet and intermediate layer (number) | Length of metallic Fe phase when cumulative relative frequency is 0.95 (nm) | Thickness of Fe-based oxide layer in final-annealed steel sheet (nm) | Residual percentage of insulation coating after φ16 mm bend test (%) | Iron loss | Note |
|---|---|---|---|---|---|---|---|---|---|---|---|---|
| Comparative Example 1 | B | 0.04 | 0.001 | 0.1 | 800° C. | 2.4 | 0 | 30 | 5 | 45 | 1.01 | Manufactured by manufacturing method according to first example |
| Example 1 | B | 0.04 | 1000 | 0.1 | 800° C. | 6.2 | 0 | 61 | 30 | 91 | 0.92 | |
| Example 2 | B | 0.04 | 50000 | 0.1 | 800° C. | 35.1 | 0 | 670 | 80 | 63 | 0.87 | |
| Comparative Example 2 | B | 0.04 | 150000 | 0.1 | 800° C. | 52.1 | 5 | 1530 | 150 | 31 | 1.1 | |
| Comparative Example 3 | B | 0.04 | 0.001 | 0.01 | 870° C. | 2.1 | 0 | 60 | 3 | 38 | 1.06 | |
| Example 3 | B | 0.04 | 1000 | 0.01 | 870° C. | 8.2 | 0 | 301 | 40 | 82 | 0.95 | |
| Example 4 | D | 0.11 | 50000 | 0.01 | 870° C. | 28.3 | 0 | 831 | 90 | 56 | 0.91 | |
| Comparative Example 4 | D | 0.11 | 150000 | 0.01 | 870° C. | 55.1 | 0 | 1670 | 140 | 10 | 1.12 | |
| Comparative Example 5 | D | 0.11 | 0.001 | 0.01 | 870° C. | 2.1 | 0 | 60 | 3 | 38 | 1.09 | |
| Example 5 | D | 0.11 | 1000 | 0.01 | 870°C: | 8.2 | 0 | 301 | 40 | 80 | 0.89 | |
| Comparative Example 6 | D | 0.11 | 0.001 | 0.1 | 850° C. | 2.0 | 0 | 20 | 4 | 39 | 1.11 | Manufactured by manufacturing method according to second example |
| Example 6 | D | 0.11 | 1000 | 0.1 | 850° C. | 10.3 | 0 | 16 | 35 | 82 | 0.9 | |
| Comparative Example 7 | E | 0.02 | 150000 | 0.001 | 870° C. | 51.2 | 0 | 1230 | 145 | 20 | 1.04 | |
| Example 7 | E | 0.02 | 50000 | 0.001 | 870° C. | 23.4 | 0 | 678 | 85 | 60 | 0.94 | |

Examples 2 to 7 and Comparative Examples 1 to 7

Grain-oriented electrical steel sheets of Experimental Examples 2 to 7 and Comparative Examples 1 to 7 were obtained under the manufacturing conditions shown in Table 5. Conditions other than the conditions shown in Table 5 were the same as in Example 1.

Examples 6 and 7 and Comparative Examples 6 and 7 shown in Table 5 were manufactured according to the manufacturing method according to the second example (the manufacturing method in which the intermediate layer and the insulation coating were formed in one process). In each of Examples 6 and 7 and Comparative Examples 6 and 7, a coating solution containing a phosphate, colloidal silica, and a chromate was applied to the surface of the final-annealed steel sheet, and the final-annealed steel sheet was annealed in an atmosphere having an oxidation degree ($P_{H2O}/P_{H2}$)

other than the conditions shown in Table 6 were the same as in Example 1. Grain-oriented electrical steel sheets of Examples 8 to 10 and Comparative Examples 10 to 22 were manufactured according to the manufacturing method according to the second example (the manufacturing method in which the intermediate layer and the insulation coating were formed in one process). In each of Examples 8 to 10 and Comparative Examples 10 to 22, a coating solution containing a phosphate, colloidal silica, and a chromate was applied to the surface of the final-annealed steel sheet, and the final-annealed steel sheet was annealed in an atmosphere having an oxidation degree ($P_{H2O}/P_{H2}$) shown in Table 5 at a temperature shown in Table 5, thereby forming an intermediate layer and an insulation coating on the surface of the final-annealed steel sheet at the same time.

(Evaluation Results)

The evaluation results are shown in Tables 5 and 6. In Tables 5 and 6, manufacturing conditions and characteristics that are not preferable are underlined. The base steel sheets of Examples 1 to 10 contained, by mass %, Si: 3.00% to 3.65%, C: 0.005% or less, Sn and Sb: 0.03% to 0.15% in total, acid-soluble Al: 0.005% or less, N: 0.0040% or less, Mn: 0.05% to 0.20%, and S and Se: 0.005% or less in total with a remainder made up of Fe and an impurity.

and, in examples in which all of the conditions were satisfied, the residual percentage of the insulation coating was particularly high.

(1) When the cumulative relative frequency is 0.95 in the cumulative frequency distribution of the lengths of the metallic Fe phases present in the interface between the

TABLE 6

| | Steel type | Sn + Sb | Oxidation degree of atmosphere in cooling procedure of final annealing process | Oxidation degree of atmosphere in heating procedure of intermediate layer forming process | Holding temperature in intermediate layer forming process | Linear fraction of metallic Fe phases (%) | Fe-based oxides in interface between base steel sheet and intermediate layer (number) | Length of metallic Fe phase when cumulative relative frequency is 0.95 (nm) | Thickness of Fe-based oxide layer in final-annealed steel sheet (nm) | Residual percentage of insulation coating after φ16 mm bend test (%) | Iron loss |
|---|---|---|---|---|---|---|---|---|---|---|---|
| Comparative Example 8 | A | <u>≤0.005</u> | <u>0.01</u> | 0.05 | 850° C. | <u>4</u> | 0 | 30 | <u>5</u> | <u>20</u> | 1.11 |
| Comparative Example 9 | A | <u>≤0.005</u> | <u>200000</u> | 0.05 | 850° C. | <u>66.1</u> | 2 | 1510 | <u>510</u> | <u>5</u> | 1.08 |
| Comparative Example 10 | A | <u>≤0.005</u> | 100 | 0.05 | 850° C. | <u>51.2</u> | 0 | 600 | 120 | <u>31</u> | 1.01 |
| Comparative Example 11 | C | 0.01 | <u>0.01</u> | 0.05 | 850° C. | <u>3</u> | 0 | 10 | 30 | <u>13</u> | 1.12 |
| Comparative Example 12 | C | 0.01 | <u>200000</u> | 0.05 | 850° C. | <u>55</u> | 0 | 510 | 110 | <u>22</u> | 1.02 |
| Example 8 | C | 0.01 | 100 | 0.05 | 850° C. | 31 | 0 | 530 | 65 | 60 | 0.99 |
| Comparative Example 13 | F | 0.8 | <u>0.01</u> | 0.05 | 850° C. | <u>1</u> | 0 | <u>5</u> | <u>5</u> | <u>41</u> | 1.11 |
| Comparative Example 14 | F | 0.8 | <u>200000</u> | 0.05 | 850° C. | <u>51</u> | 0 | 250 | 120 | <u>30</u> | 1.03: |
| Example 9 | C | 0.8 | 100 | 0.05 | 850° C. | 5.9 | 0 | 20 | 15 | 88 | 0.89 |
| Comparative Example: 15 | G | 0.9 | <u>0.01</u> | 0.05 | 850° C. | <u>1</u> | 0 | 5 | <u>3</u> | <u>41</u> | 1.03 |
| Comparative Example 16 | G | 0.9 | <u>200000</u> | 0.05 | 850° C. | <u>52</u> | 0 | 300 | 110 | <u>28</u> | 1.15 |
| Example 10 | G | 0.9 | 100 | 0.05 | 850° C. | 6.2 | 0 | 45 | 20 | 84 | 0.91 |
| Comparative Example 17 | H | <u>1.1</u> | <u>0.01</u> | 0.05 | 850° C. | <u>1</u> | 0 | 10 | <u>5</u> | <u>20</u> | 1.11 |
| Comparative Example 18 | H | <u>1.1</u> | <u>200000</u> | 0.05 | 850° C. | <u>4</u> | 0 | 20 | <u>9</u> | <u>11</u> | 1.08 |
| Comparative Example 19 | H | <u>1.1</u> | 100 | 0.05 | 850° C. | <u>4</u> | 0 | 15 | <u>7</u> | <u>29</u> | 1.03 |
| Comparative Example 20 | I | <u>1.2</u> | <u>0.01</u> | 0.05 | 850° C. | <u>1</u> | 0 | 5 | 2 or less | <u>8</u> | 1.11 |
| Comparative Example 21 | I | <u>1.2</u> | <u>200000</u> | 0.05 | 850° C. | <u>3</u> | 0 | 25 | <u>8</u> | <u>7</u> | 1.04 |
| Comparative Example 22 | I | <u>1.2</u> | 100 | 0.05 | 850° C. | <u>2</u> | 0 | 20 | <u>4</u> | <u>10</u> | 1.04 |

As shown in Tables 5 and 6, the grain-oriented electrical steel sheets of Example 1 to Example 10 had a high residual percentage of the insulation coating and were superior in terms of the adhesion of the insulation coating to the grain-oriented electrical steel sheets of Comparative Examples 1 to 22.

That is, the grain-oriented electrical steel sheets in which the metallic Fe phases were present in the interface between the intermediate layer and the insulation coating and the percentage of the total of the lengths of the metallic Fe phases with respect to the length of the interface was 5% to 50% in the cross section perpendicular to the rolling direction had sufficient adhesion of the insulation coating.

In Example 1 to Example 10, after the final annealing, the decarburization-annealed steel sheet was cooled from 1100° C. to 500° C. in an atmosphere having an oxidation degree ($P_{H_2O}/P_{H_2}$) of 0.3 to 100000. Therefore, it was possible to set the linear fraction of the metallic Fe phases to 5% to 50%.

In addition, among the examples, in examples in which any of the following conditions was further satisfied, the residual percentage of the insulation coating became higher, intermediate layer and the insulation coating in a cross section perpendicular to a rolling direction, the length of the metallic Fe phase is 500 nm or less.

(2) The number of Fe-based oxides having a thickness of more than 2 nm is zero in the interface between the base steel sheet and the intermediate layer.

In contrast, the grain-oriented electrical steel sheets in which the metallic Fe phases were present in the interface between the intermediate layer and the insulation coating, and the percentage of the total of the lengths of the metallic Fe phases with respect to the length of the interface was less than 5% and more than 50% in a cross section perpendicular to the rolling direction (that is the grain-oriented electrical steel sheets of Comparative Examples 1 to 22), the adhesion of the insulation coating was not sufficient.

INDUSTRIAL APPLICABILITY

According to the aspects of the present invention, it is possible to provide a grain-oriented electrical steel sheet that has a low iron loss and is excellent in terms of the adhesion of an insulation coating and a method for manufacturing the same.

BRIEF DESCRIPTION OF THE REFERENCE SYMBOLS

A, A2 Grain-oriented electrical steel sheet
1, 12 Base steel sheet
2A Final-annealed film
2B, 2B2 Intermediate layer
3, 32 Insulation coating
42 Metallic Fe phase
52 Fe-based oxide

The invention claimed is:

1. A grain-oriented electrical steel sheet comprising:
a base steel sheet in which a final-annealed film is substantially not present on a surface;
an intermediate layer that is disposed on a surface of the base steel sheet and mainly contains silicon oxide; and
an insulation coating disposed on a surface of the intermediate layer,
wherein, in the intermediate layer, a value obtained by dividing a standard deviation σ of a thickness of the intermediate layer by an average value T of the thickness of the intermediate layer is 0.500 or less.

2. A method for manufacturing the grain-oriented electrical steel sheet according to claim 1, the method comprising:
heating a slab containing Si and then performing hot rolling to obtain a hot-rolled steel sheet,
performing hot band annealing on the hot-rolled steel sheet to obtain an annealed steel sheet,
performing cold rolling on the annealed steel sheet once or twice or more with intermediate annealing performed therebetween to obtain a cold-rolled steel sheet,
performing decarburization annealing on the cold-rolled steel sheet to obtain a decarburization-annealed steel sheet,
heating the decarburization-annealed steel sheet with an annealing separator having a MgO content of 10 mass % to 50 mass % applied to a surface of the decarburization-annealed steel sheet and then removing the annealing separator to obtain a final-annealed steel sheet,
performing thermal oxidation annealing on the final-annealed steel sheet to form an intermediate layer on a surface of the final-annealed steel sheet, and
forming an insulation coating on the final-annealed steel sheet having the intermediate layer formed thereon,
wherein, during cooling for final annealing,
T1 is set to 1100° C. in a case where a final annealing temperature is 1100° C. or higher and T1 is set to the final annealing temperature in a case where the final annealing temperature is lower than 1100° C., and
the decarburization-annealed steel sheet is cooled within a temperature range of T1 to 500° C. in an atmosphere having an oxidation degree ($P_{H2O}/P_{H2}$) of 0.3 to 100000,
in the thermal oxidation annealing for the formation of the intermediate layer,
during heating,
an average heating rate within a temperature range of 300° C. to 750° C. is set to 20° C./second to 200° C./second, an oxidation degree ($P_{H2O}/P_{H2}$) within the temperature range is set to 0.0005 to 0.1, the final-annealed steel sheet is heated up to a temperature range of 750° C. to 1150° C. and
held within the temperature range of 750° C. to 1150° C.
in an atmosphere having an oxidation degree ($P_{H2O}/P_{H2}$) of 0.0005 to 0.2 for 10 seconds to 90 seconds.

* * * * *